US012030402B2

(12) United States Patent
Boyce et al.

(10) Patent No.: US 12,030,402 B2
(45) Date of Patent: Jul. 9, 2024

(54) BATTERY SWAP SYSTEM

(71) Applicant: Zimeno, Inc., Livermore, CA (US)

(72) Inventors: Ryan Alexander Boyce, Calabasas, CA (US); Zachary Meyer Omohundro, Hermosa Beach, CA (US); Praveen Varma Penmetsa, Newark, CA (US)

(73) Assignee: Zimeno Inc., Livermore, CA (US)

(*) Notice: Subject to any disclaimer, the term of this patent is extended or adjusted under 35 U.S.C. 154(b) by 45 days.

(21) Appl. No.: 17/522,280

(22) Filed: Nov. 9, 2021

(65) Prior Publication Data

US 2022/0144220 A1 May 12, 2022

Related U.S. Application Data

(60) Provisional application No. 63/111,372, filed on Nov. 9, 2020.

(51) Int. Cl.
*B60L 53/80* (2019.01)
*H01M 50/244* (2021.01)
*H01M 50/249* (2021.01)
*H01M 50/256* (2021.01)

(52) U.S. Cl.
CPC ........... *B60L 53/80* (2019.02); *H01M 50/244* (2021.01); *H01M 50/249* (2021.01); *H01M 50/256* (2021.01); *H01M 2220/20* (2013.01)

(58) Field of Classification Search
CPC ............. H01M 50/256; H01M 50/249; H01M 50/244; B60L 53/80
See application file for complete search history.

(56) References Cited

U.S. PATENT DOCUMENTS

| | | | |
|---|---|---|---|
| 4,060,310 | A | 11/1977 | Brown |
| 4,326,549 | A | 4/1982 | Hinding |
| 4,541,051 | A | 9/1985 | Jarret et al. |
| 4,873,475 | A | 10/1989 | Togo et al. |
| 5,035,158 | A | 7/1991 | Leigh-Monstevens |
| 5,101,922 | A | 4/1992 | Ohmura |
| 5,301,765 | A | 4/1994 | Swanson |
| 5,360,307 | A | 11/1994 | Schemm et al. |
| 5,365,283 | A | 11/1994 | Doherty et al. |
| 5,456,333 | A | 10/1995 | Brandt et al. |
| 5,492,192 | A | 2/1996 | Brooks et al. |
| 5,529,028 | A | 6/1996 | Weikert |

(Continued)

FOREIGN PATENT DOCUMENTS

| | | |
|---|---|---|
| CN | 106740724 | 5/2017 |
| CN | 212243022 | 12/2020 |

(Continued)

OTHER PUBLICATIONS

International Search Report and Written Opinion for PCT/US2021/058580 dated Feb. 24, 2022.

(Continued)

*Primary Examiner* — Sarah A. Slifka
(74) *Attorney, Agent, or Firm* — Rathe Lindenbaum LLP

(57) ABSTRACT

An example battery swap system may include a battery transport. The battery transport may include a support frame, a connector coupled to the support frame and configured to connect to a powered vehicle for moving the battery transport, and a battery carriage movably coupled to the support frame and configured to horizontally carry a battery from a transport supported position to a tractor received position.

22 Claims, 27 Drawing Sheets

(56) References Cited

U.S. PATENT DOCUMENTS

| | | | |
|---|---|---|---|
| 5,652,487 | A | 7/1997 | Nishino et al. |
| 5,657,099 | A | 8/1997 | Doherty et al. |
| 5,751,579 | A | 5/1998 | Hrovat et al. |
| 5,951,115 | A | 9/1999 | Sakai et al. |
| 6,108,193 | A | 8/2000 | Haberstroh |
| 6,119,802 | A | 9/2000 | Puett, Jr. |
| 6,154,702 | A | 11/2000 | Fodor et al. |
| 6,219,607 | B1 | 4/2001 | Piepenbrink et al. |
| 6,250,409 | B1 | 6/2001 | Wells |
| 6,298,941 | B1 | 10/2001 | Spadafora |
| 6,305,506 | B1 | 10/2001 | Shirai et al. |
| 6,577,025 | B2 | 6/2003 | Hentschel et al. |
| 6,717,281 | B1 | 4/2004 | Brandon et al. |
| 6,727,669 | B2 | 4/2004 | Suzuki et al. |
| 6,874,592 | B2 | 4/2005 | Yokotani et al. |
| 6,978,856 | B2 | 12/2005 | Nakamura et al. |
| 7,032,981 | B2 | 4/2006 | Frey et al. |
| 7,104,364 | B2 | 9/2006 | Godlewsky et al. |
| 7,185,745 | B2 | 3/2007 | Godlewsky et al. |
| 7,201,384 | B2 | 4/2007 | Chaney |
| 7,347,803 | B2 | 3/2008 | Kobayashi et al. |
| 7,351,182 | B2 | 4/2008 | Kobayashi |
| 7,828,099 | B2 | 11/2010 | Heckeroth |
| 7,902,987 | B2 | 3/2011 | Lemasson et al. |
| 7,954,960 | B2 | 6/2011 | Shirai et al. |
| 8,052,221 | B2 | 11/2011 | Deetjen |
| 8,083,245 | B2 | 12/2011 | Hatzikakidis |
| 8,193,650 | B2 | 6/2012 | Thorne |
| 8,197,077 | B2 | 6/2012 | Brouwer |
| 8,246,120 | B2 | 8/2012 | Bourqui et al. |
| 8,288,979 | B2 | 10/2012 | Bates et al. |
| 8,327,960 | B2 | 12/2012 | Couture et al. |
| 8,347,994 | B2 | 1/2013 | Bering et al. |
| 8,413,752 | B2 | 4/2013 | Page et al. |
| 8,466,578 | B2 | 6/2013 | Ackert et al. |
| 8,467,929 | B2 | 6/2013 | Bechtler et al. |
| 8,494,699 | B2 | 7/2013 | Bourqui et al. |
| 8,500,289 | B2 | 8/2013 | Shibasaki |
| 8,684,115 | B2 | 4/2014 | Bryant |
| 8,701,812 | B2 | 4/2014 | Uno |
| 8,714,292 | B1 | 5/2014 | Wong |
| 8,717,156 | B2 | 5/2014 | Tronnier et al. |
| 9,061,592 | B2 | 6/2015 | Meng |
| 9,061,680 | B2 | 6/2015 | Dalum |
| 9,085,302 | B2 | 7/2015 | Borroni-Bird et al. |
| 9,199,609 | B2 | 12/2015 | Rasal |
| 9,221,451 | B2 | 12/2015 | Ahn |
| 9,302,667 | B2 | 4/2016 | Tassinger et al. |
| 9,308,964 | B2 | 4/2016 | Saida |
| 9,358,895 | B2 | 6/2016 | Avganim |
| 9,415,715 | B2 | 8/2016 | Boulton |
| 9,481,263 | B2 | 11/2016 | Ebert et al. |
| 9,561,767 | B2 | 2/2017 | Darraba et al. |
| 9,561,779 | B2 | 2/2017 | Rasal et al. |
| 9,615,497 | B2 | 4/2017 | Bassett et al. |
| 9,711,767 | B2 | 7/2017 | Juenger et al. |
| 9,947,148 | B2 | 4/2018 | Moellmann et al. |
| 10,029,571 | B2 | 7/2018 | Ito et al. |
| 10,046,641 | B2 | 8/2018 | Penmetsa et al. |
| 10,093,308 | B2 | 10/2018 | Sugai et al. |
| 10,104,824 | B2 | 10/2018 | Blackwell et al. |
| 10,112,471 | B2 | 10/2018 | Higuchi et al. |
| 10,183,563 | B2 | 1/2019 | Rayner et al. |
| 10,259,498 | B2 | 4/2019 | Jägenstedt et al. |
| 10,322,769 | B2 | 6/2019 | Tanaka et al. |
| 10,379,532 | B2 | 8/2019 | Cameron et al. |
| 10,458,402 | B2 | 10/2019 | Yan et al. |
| 10,466,699 | B2 | 11/2019 | Hirata et al. |
| 10,562,381 | B2 | 2/2020 | Haubs et al. |
| 10,562,400 | B2 | 2/2020 | Ryu |
| 10,589,738 | B1 | 3/2020 | Boecker et al. |
| 10,659,707 | B2 | 5/2020 | Oka et al. |
| 10,734,878 | B2 | 8/2020 | Kim et al. |
| 10,788,043 | B2 | 9/2020 | He et al. |
| 10,793,084 | B2 | 10/2020 | Jiang et al. |
| 10,807,492 | B1 | 10/2020 | Holland et al. |
| 10,814,794 | B1 | 10/2020 | Jadhav |
| 10,814,889 | B2 | 10/2020 | Looney et al. |
| 10,836,242 | B2 | 11/2020 | Huff et al. |
| 10,858,041 | B2 | 12/2020 | Jägenstedt et al. |
| 10,946,856 | B2 | 3/2021 | Oyama et al. |
| 10,980,173 | B2 | 4/2021 | Becke et al. |
| 11,021,158 | B2 | 6/2021 | Mueller et al. |
| 11,225,151 | B2 | 1/2022 | Enning |
| 2007/0012496 | A1 | 1/2007 | Chene et al. |
| 2007/0029117 | A1 | 2/2007 | Goldenberg et al. |
| 2012/0217074 | A1 | 8/2012 | Rudinec |
| 2015/0105965 | A1 | 4/2015 | Blackwell et al. |
| 2016/0334801 | A1 | 11/2016 | Ratanaphanyarat et al. |
| 2016/0368464 | A1 | 12/2016 | Hassounah |
| 2017/0263914 | A1 | 9/2017 | Ito |
| 2021/0223772 | A1 | 7/2021 | Penmetsa et al. |

FOREIGN PATENT DOCUMENTS

| | | | |
|---|---|---|---|
| CN | 114771287 | | 7/2022 |
| EP | 2543093 | | 2/2020 |
| WO | 2020106142 | A1 | 5/2020 |
| WO | 2020106143 | A1 | 5/2020 |
| WO | 2020152123 | A1 | 7/2020 |
| WO | 2021146478 | A1 | 7/2021 |
| WO | 2021146493 | A1 | 7/2021 |
| WO | 2021146510 | A1 | 7/2021 |

OTHER PUBLICATIONS www.AgXeed.com; print screen dated Feb. 20, 2024; AgXeed, Oirlo, The Netherlands; 9 pages.

Ztractor.com image; 1 page.

BATTERY SWAP SYSTEM

CROSS-REFERENCE TO RELATED APPLICATIONS

The present non-provisional application claims priority from co-pending U.S. provisional patent Application Ser. No. 63/111,372 filed on Nov. 9, 2020, by Boyce et al. and entitled BATTERY SWAP SYSTEM, the full disclosure of which is hereby incorporated by reference.

BACKGROUND

Tractors are used for a variety of purposes in agricultural, construction and residential purposes. Some tractors are used to push or pull an implement. Some tractors include attachments, such as a bucket, blade, backhoe, or the like for digging, displacing, and/or carrying various materials such as earthen materials, forestry products, animal waste and produce. Some tractors may include forks or other coupling mechanisms for engaging pallets, bins, boxes, or the like, wherein the tractors carry and/or lift the engaged items. Some tractors may be powered by an electrical battery.

Figure 1:
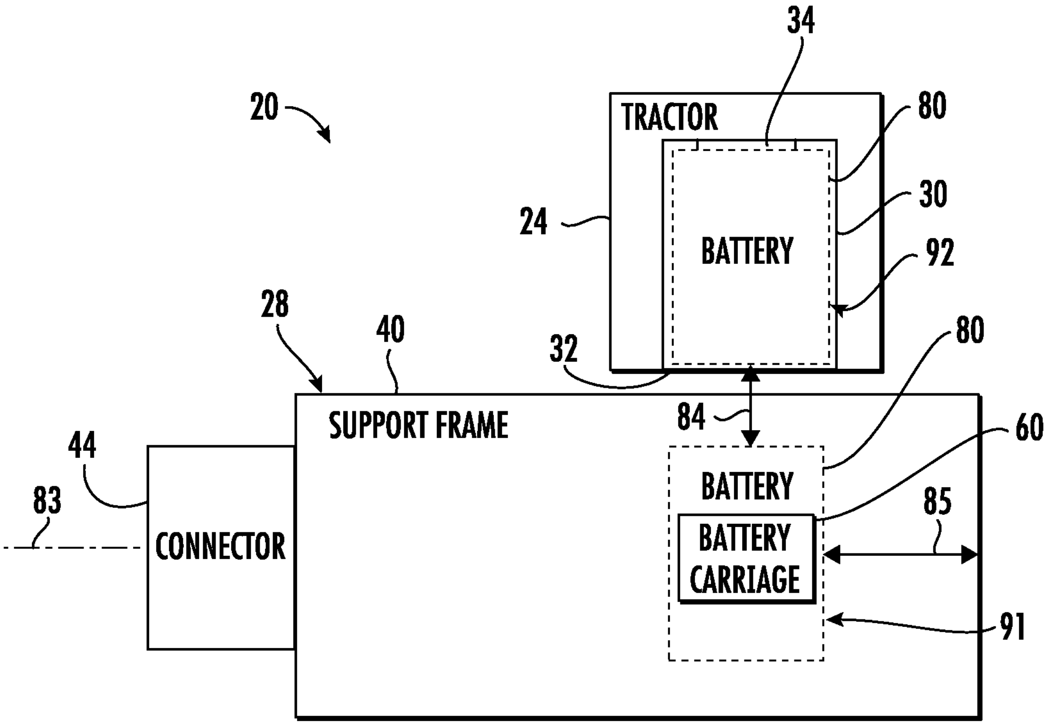
FIG. 1 is a diagram schematically illustrating portions of an example battery swap system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Battery powered agricultural and forestry tractors, and utility off-road vehicles, are intended to operate continuously under heavy loading conditions for extended periods of time. A fully electrically charged battery pack of a heavily loaded tractor runs down after several hours of operation. Disclosed are in-field battery swap systems enable continuous operation of electric equipment in remote and austere locations. Operations in farm fields, construction sites, forests, and other austere locations often require high continuous power levels in the absence of infrastructure. The fast replacement of a fully contained module, but depleted battery pack, with a fully charged pack can solve the tractor down time problem.

Disclosed are example battery swap systems, battery swap tractors, battery transports and swappable batteries. The present disclosure describes various examples of how a battery used to power a tractor may be swapped. The present disclosure describes very examples of how example batteries may be swapped at a remote location in a field/worksite/forest from a battery transport that may be transported by the tractor itself or another vehicle. Because the battery of the tractor may be swapped while at a remote location or infield/worksite/forest, the tractor may remain at the remote location, increasing productivity.

FIG. 1 is a block diagram schematically illustrating portions of an example battery swap system 20. battery swap system 20 comprises tractor 24 and battery transport 28. Tractor 24 may have a variety of forms. In some implementations, tractor 24 may include wheels, at least two of which are rotatably driven using electrical power from a swappable battery. In some implementations, tractor 24 may include tracks, wherein the tracks are driven using electrical power from a swappable battery.

Tractor 24 may be used for a variety of purposes in agricultural construction and residential purposes. Tractor 24 may be used to push or pull an implement. Tractor 24 may include attachments, such as a bucket, blade, backhoe, or the like for digging, displacing, and/or carrying various materials such as earthen materials, animal waste and produce. Tractor 24 may include forks or other coupling mechanisms for engaging pallets, bins, boxes, or the like, wherein the tractors carry and/or lift the engaged items. Tractor 24 comprises an internal battery receiving cavity 30 and battery interface 34.

Cavity 30 comprises an opening 32 sized to removably receive a swappable battery. For purposes of this disclosure, the term "releasably" or "removably" with respect to an attachment or coupling of two structures means that the two structures may be repeatedly connected and disconnected to and from one another without material damage to either of the two structures or their functioning.

In one implementation, opening 32 extends along a front face that are front periphery of tractor 24 with cavity 30 extending rearwardly into tractor 24. For example, in some implementations, cavity 30 may underlie the front hood of tractor 24, wherein opening 32 extends along a front face of the hood. In some implementations, opening 32 may extend along a side or a rear of tractor 24.

Battery interface 34 comprises a mechanism by which electrical connection may be made to a swappable battery received within cavity 30. battery interface 34 facilitates the transmission electrical current from battery 80 to the powered components of tractor 24. In some implementations, battery interface 34 may comprise a socket or plug. In other implementations, battery interface 34 may comprise other electrical connecting interfaces.

Battery transport 28, sometimes referred to as a swap cart, comprises a structure to transport a battery, or a magazine of batteries, to a location such as a field/worksite/forest or other remote location. battery transport 28 comprises support frame 40, mechanical connector 44 and battery carriage 60. Support frame 40 comprises a structure that supports the remaining components of battery transport 28. Support frame 40 may be a rectangular framework of metal bars and brackets, trusses, and the like. In some implementations, support frame 40 is coupled to ground engaging members that movably support frame 40 on a surface, such as wheels or tracks. In some implementations, support frame 40 is cantilevered or suspended above the underlying terrain by the tractor or vehicle carrying the support frame 40. In such implementations, the ground engaging members may be omitted.

Connector 44 is mechanically coupled to support frame 40 and facilitates connection of support frame 40 to a powered vehicle, such as a tractor or another vehicle, for movement of transport 28. In implementations where support frame 40 and the rest of transport 28 are pulled/towed, connector 44 may comprise a drawbar for hitching to the tractor or other vehicle. In implementations where support frame 40 and the rest of transport 28 are cantilevered or suspended from the tractor other vehicle, connector 44 may facilitate such connection and suspension. For example, connector 44 may comprise a three-point attachment for releasable connection to a top link and lift arms of a three-point hitch connection of tractor 24 or another vehicle. In yet other implementations, connector 44 may comprise other mechanisms for releasably or removably connecting battery transport 28 to tractor 24 or another vehicle.

Battery carriage 60 is movably coupled to support frame 40 for movement relative to support frame 40. For purposes of this disclosure, the term "coupled" shall mean the joining of two members directly or indirectly to one another through other members. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Battery carriage 60 is configured to releasably engage a swappable battery 80 (shown in broken lines) so as to move or carry battery 80 from a transport supported position 91 to a tractor received position 92. For purposes of this disclosure, the phrase "configured to" denotes an actual state of configuration that fundamentally ties the stated function/use to the physical characteristics of the feature proceeding the phrase "configured to". In the tractor received position 82, battery 80 is received within cavity 30 and is either connected to interface 34 or is ready for connection to interface 34.

In some implementations, battery carriage 60 is moved (along with battery 80) using manual force from a person through the use of a crank or the like. In some implementations, battery carriage 60 is moved (along with battery 80), using a power source, such as the power from battery 80 itself or an alternative power source. For example, in some implementations, battery carriage 60 may be connected to a worm gear follower that moves along a worm gear that is manually rotated through use of a crank or that is rotatably driven by an electric, hydraulic or pneumatic motor. In other implementations, battery carriage 60 may be connected to threaded coupler that moves along a threaded lead screw that is manually rotated through use of a crank or that is rotatably driven by an electric, hydraulic or pneumatic motor. In some implementations, battery carriage 60 hooks or clamps onto battery 80. In some implementations, battery carriage 60 underlies battery 80 without being hooked or clamped onto battery 80. In such implementations, carriage 60 may comprise a push plate for engaging a side of battery 80.

In the example illustrated, connector 44 is projected from a longitudinal end of support frame 40, wherein connector 44 and support frame 40 are serially located along an axis 83 and wherein carriage 60 is movable (along with battery 80) relative to support frame 40 in a direction perpendicular to axis 83 as indicated by arrows 84. In implementations where support frame 40 is movably supported by wheels, such wheels may rotate about axes that are also perpendicular to axis 83. In other implementations, as indicated by arrows 85, carriage 60 may be movable (along with battery 80) relative to support frame 40 in a direction parallel to axis 83. In such an implementation, opening 32 and cavity 30 would be positioned at an end of transport 28 with opening 32 facing in a direction parallel to axis 83 for the reception of battery 80.

Figure 2:
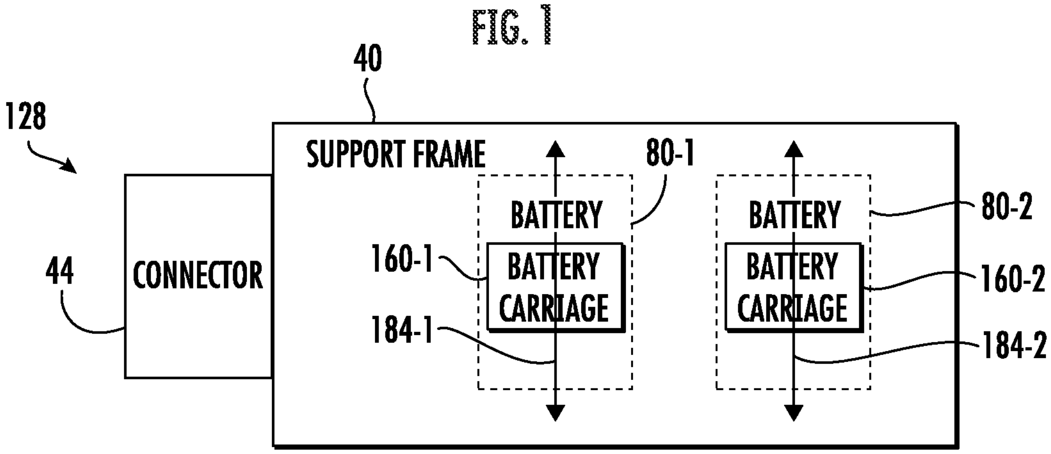
FIG. 2 is a diagram schematically illustrating portions of an example battery swap system.

FIG. 2 is a block diagram schematically illustrating portions of an example battery transport 128. battery transport 128 may be used with tractor 24 described above. FIG. 2 illustrates an example of a battery transport that may concurrently support multiple batteries such as a discharged battery removed from tractor 24 and a charged battery for loading into tractor 24. Transport 128 is similar to transport 28 except that transport 128 comprises battery carriages 160-1 and 160-2 (collectively referred to as battery carriages 160). Those remaining components of battery transport 128 which correspond to components of battery transport 28 are numbered similarly.

Each of battery carriages 160 is similar to battery carriage 60 described above. battery carriages 160 are configured to move and position respective batteries 80-1 and 80-2 along parallel axes as indicated by arrows 184-1 and 184-2, respectively. Each of battery carriages 160 is configured to move its respective battery from a transport supported position to a tractor received position.

During an example operation, carriage 160-1 may be first positioned by the tractor or other vehicle in alignment with opening 32 of tractor 24, wherein carriage 160-1 may be connected to the battery and moved to withdraw the battery 80-1 from cavity 30 and onto transport 28. Thereafter, carriage 160-2, supporting a replacement battery, such as a charged battery 80-2, may be positioned by the tractor or other vehicle in line with opening 32 of tractor 24, wherein carriage 160-2 may be moved to insert battery 80-2 through opening 32 and into cavity 30. The battery 80-2 may be further removed from the interconnection with battery interface 34. Thereafter, battery 80-2 may be disconnected from battery carriage 160-2. As should be appreciated, this operation may be reversed such as when battery carriage 160-2 is to withdraw a discharge battery from tractor 24 and battery carriage 160-1 is to load a charged battery into tractor 24.

Figure 3:
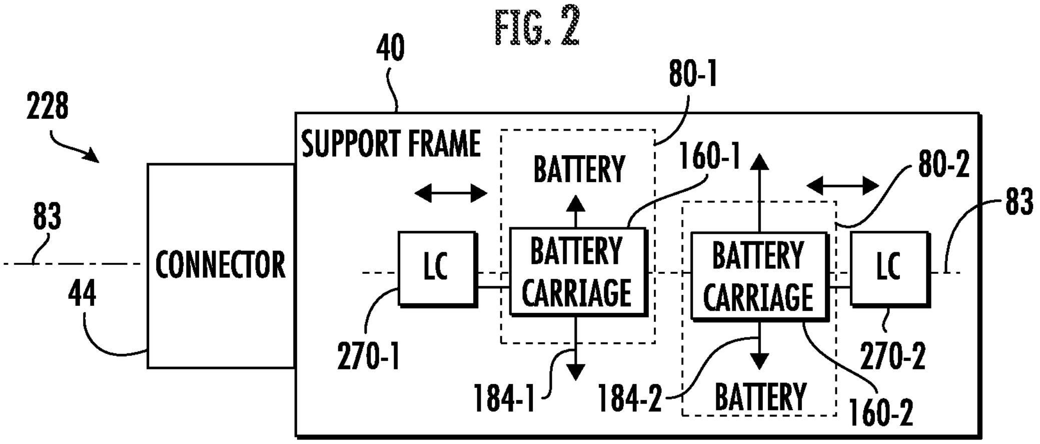
FIG. 3 is a diagram schematically illustrating portions of an example battery swap system.

FIG. 3 is a block diagram schematically illustrating portions of an example battery transport 228. Battery transport 228 may be used with tractor 24 described above. FIG. 3 illustrates an example of a battery transport that may selectively align each of multiple battery carriages with a battery receiving cavity of a tractor by moving the battery carriages relative to the support frame of the battery transport. Transport 228 is similar to transport 128 except that transport 228 comprises locating carriages 270-1, 270-2 (collectively referred to as locating carriages 270). Those remaining components of battery transport 128 which correspond to components of battery transport 28 are numbered similarly.

Locating carriages 270 comprise mechanisms operably coupled to battery carriages 160-1 and 160-2, respectively, so as to move battery carriages 160 in directions perpendicular to the axes along which battery carriages 160 move. In the example illustrated, locating carriages 270 are operable to move battery carriages 160 along axis 83. In the example illustrated, each of locating carriages 270 is configured to independently move its respective battery carriage 160 relative to support frame 40. As a result, battery carriages 160-1 may be moved by locating carriages 270 relative to one another with respect to support frame 40. For example, locating carriage 270-1 may move battery carriage 160-1 by a first distance in a first direction along axis 83. At the same time locating carriage 270-2 may move battery carriage 160-2 by second distance, different than the first distance, in the first direction along axis 83 or in a second opposite direction along axis 83. In some implementations, one of locating carriages 270 may move its respective battery carriage while the other battery carriage associated with the other locating carriage remain stationary.

In some implementations, locating carriages 270 are manually driven, such as through the use of a manually rotated crank. In some implementations, locating carriages 270 may be moved through the use of a powered device, such as an electric solenoid, electric motor, hydraulic motor, pneumatic motor, or the like. For example, in some implementations, locating carriages 270 may be connected to a threaded follower that moves along a threaded lead screw that is manually rotated through use of a crank or that is rotatably driven by an electric, hydraulic or pneumatic motor.

In some implementations, battery carriages 160 may be linked and one of locating carriages 270 may be omitted, wherein the remaining locating carriage 270 concurrently moves both of battery carriages 160 relative to support frame 40 in unison.

Figure 4:
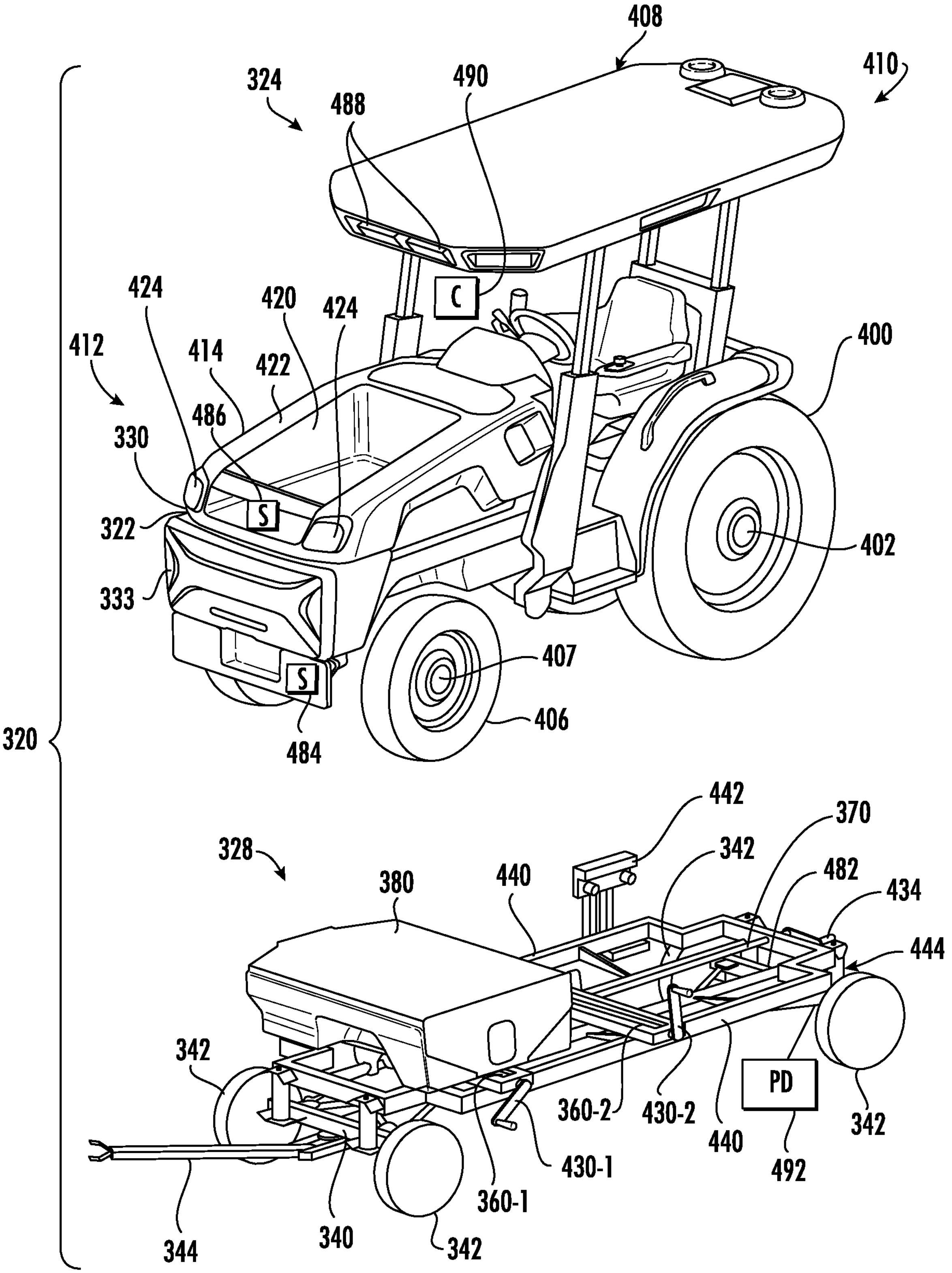
FIG. 4 is a front perspective view of an example battery swap system supporting a swappable battery.

FIG. 4 illustrates portions of an example battery swap system 320 supporting a swappable battery 380. Battery swap system 320 comprises tractor 324 and battery transport 328. Tractor 324 comprises an electrically driven or powered tractor having internal electric motors that rotatably drive rear wheels 400 supported by a rear axle 402. Tractor 324 further comprises front, driven or undriven, wheels 406 which rotate about front axles 407 and which are connected to a steering linkage (not shown) to facilitate steering of tractor 324 by an operator residing in cab 408. In some implementations, cab 408 may be omitted such as where tractor 324 is remotely controlled. Tractor 324 is configured to pull/tow implements using a hitch system (not shown).

Tractor 324 has a rear 410 and a front 412. Tractor 324 comprises a front chassis 414 that extends forward of cab 408 between or proximate to front wheels 406. Front chassis 414 comprises a battery receiving cavity 330 which may be accessed through a front opening 332. In the example illustrated, the front opening 332 is temporarily covered by front cover 333, wherein the front cover 333 may be removed during a battery swapping operation. In other implementations, cover 333 may be omitted, wherein a face of the battery, received within battery receiving cavity 330 may form or provide the front of tractor 324. In the example illustrated, battery receiving cavity 330 extends below a cargo bed 420 formed in the hood 422 of front chassis 414. In the example illustrated, battery receiving cavity 330 extends between front headlights 424 of tractor 324 and the front wheel 406 and/or the front axles 407 of front wheels 406.

Tractor 324 may further include a battery connection interface 34 (shown and described above with respect to tractor 24), wherein the interface 34 is provided internal to battery receiving cavity 330. In other implementations, interface 34 may be external to cavity 330, proximate to opening 332. For example, electrical cables may be utilized to electrically connect a battery received within cavity 330 and such an external battery connection interface 34.

Battery transport 328 is configured to be pulled by tractor 324, to be disconnected from tractor 324 and to facilitate the swapping of batteries for powering tractor 324. battery transport 328 comprises support frame 340, wheels 342, connector 344, floating support frame 440, battery carriages 360-1, 360-2 (collectively referred to as carriages 360), manual cranks 430-1, 430-2 (collectively referred to as cranks 430), locating carriage 370, manual crank 434, battery charging system 442 and carriage suspension system 444.

Support frame 340 serves as a chassis for transport 328, being pivotally connected to connector 344. Connector 344 comprises a drawbar for connection to tractor 324. Support frame 340 rotatably supports wheels 342 for movement of transport 328 as it is being pulled by tractor 324 or another vehicle. Support frame 340 indirectly supports carriages 360 and 370.

Floating support frame 440 is supported by support frame 340 and supports carriages 360 and 370. As will be described hereafter with respect to carriage suspension system 444, floating support frame 440 floats or moves relative to the support frame 340 to facilitate alignment of a supported battery with respect to opening 332 of tractor 324. In some implementations, floating support frame 440 may be omitted, wherein support frame 340 comprises a structure configured to directly support carriages 360 and 370.

Figure 5:
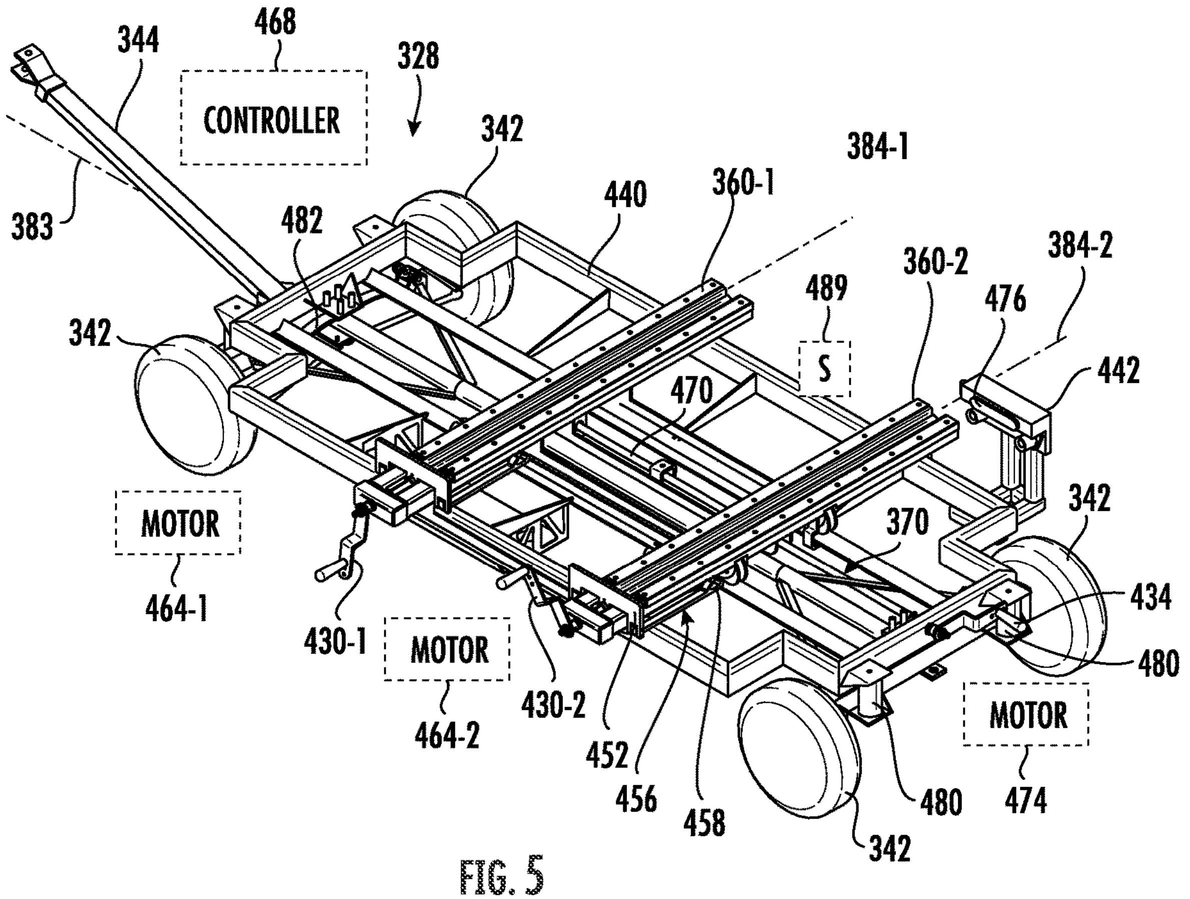
FIG. 5 is a rear perspective view of an example battery transport.

As seen in FIG. 5, carriages 360 are spaced from one another along axis 383 which extends perpendicular to the rotational axes of wheels 342. Carriages 360 extend along axes 384-1, 384-2, respectively, which extend perpendicular to axis 383. Carriages 360-1, 360-2 are configured to carry and move engaged and supported batteries, such as battery 380, along axes 384-1 and 384-2, respectively, between transport supported positions and tractor received positions.

Figure 6:
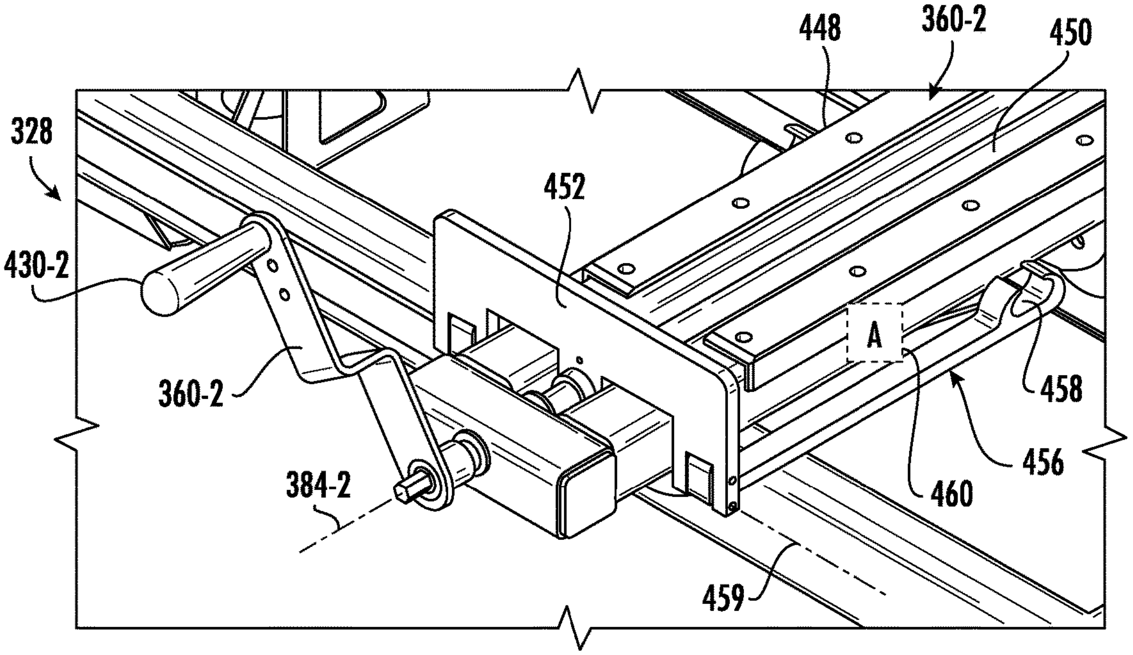
FIG. 6 is an enlarged fragmentary perspective view illustrating portions of the battery transport of FIG. 5.

As shown by FIG. 6, each of carriages 360 comprises battery guide 448, worm gear 450 and a worm gear follower 452. battery guide 448 serves as a structure for rotatably supporting worm gear 450. battery guide 448 further serves as a track, guiding and controlling positioning of a supported battery 380 as it is being moved. battery guide 448 comprises an elongate projection that is shaped, sized and located so as to be slidably received within a corresponding elongate groove or channel formed on the underside of battery 380.

Worm gear 450 is rotatably supported by battery guide 448. Worm gear follower 452 comprises an internally threaded member receiving worm gear 450. Rotation of worm gear 450 results in linear movement of worm gear follower 452 along the axis of worm gear 450, axis 384-1 for carriage 360-1 or axis 384-2 for carriage 360-2.

As further shown by FIG. 6, each of carriages 360 carries a battery connector 456. battery connector 456 comprises a mechanism to releasably engage a supported battery such that a supported battery 380 moves in unison with worm gear follower 452. In the example illustrated battery connector 456 comprises a pair of hooks 458 which are movably coupled to worm gear follower 452. In the example illustrated, hooks 458 are pivotably coupled to worm gear follower 452 for pivotal movement about axis 459. Hooks 458 pivot about axis 459 between a battery connected position or state and a battery disconnected position or state. In some implementations, hooks 458 may slide or translate within a groove between a battery connected state and a battery disconnected state.

In some implementations, hooks 458 are manually movable between the battery connected state and the battery disconnected state. In some implementations, battery connector 456 may be manually pivoted or translated between the battery connected state and the battery disconnected state. For example, battery connector 456 may include a lever to facilitate pivoting of hooks 458.

In some implementations, as indicated by broken lines, battery transport 328 may additionally comprise a powered actuator 460 for moving hook 458 between the battery connector state and the battery disconnected state. For example, actuator 460 may comprise an electric solenoid having a first end connected to guide 448 and a second end connected to the arm of battery connector 456 supporting hook 458. In such an implementation, actuator 460 may be connected to both of hooks 458 for movement of hooks 458 in unison.

FIGS. 7A-7E illustrate an example of battery 380 in more detail. As shown by such figures, battery 380 comprises a channel 382 that extends along a lower surface of battery 380, along a longitudinal length of battery 380. Channel 382 is sized to slidably receive guide 448 of each of carriages 360.

Figure 7A:
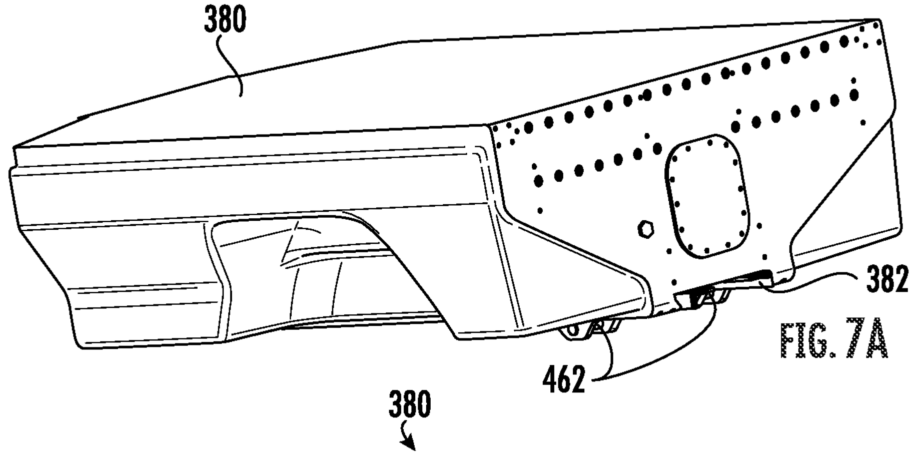
FIG. 7A is a front perspective view of an example battery of the example battery transport system of FIG. 4.
Figure 7B:
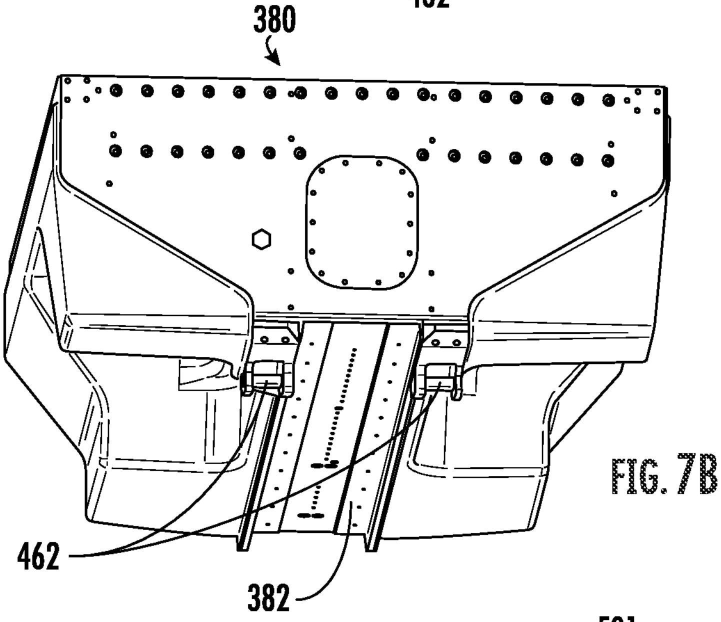
FIG. 7B is a front bottom perspective view of the example battery of FIG. 7A.
Figure 7C:
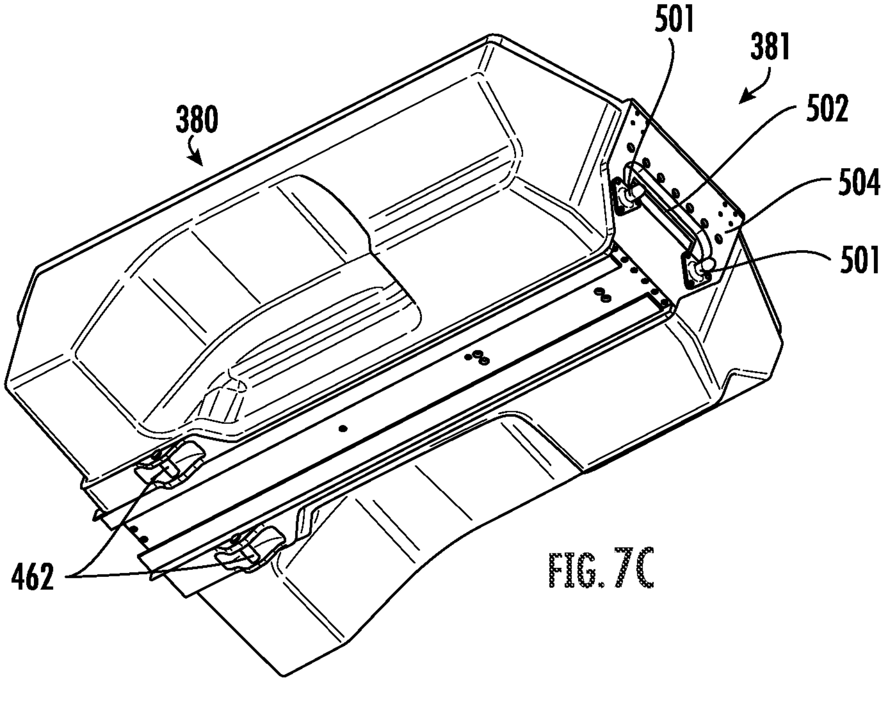
FIG. 7C is a side bottom perspective view of the example battery of FIG. 7A.

FIG. 7C illustrates the head or active end 381 of battery 380. Active end 381 is the end of battery 380 that is first inserted into opening 332 of tractor 324. In the example illustrated, electrical connection between battery 380 and tractor 324 is facilitated at active end 381. In other implementations, such electrical connection may be provided on other faces or surfaces of battery 380.

Active end 381 comprises alignment interfaces 501 and electrical connection interface 502. Alignment interfaces 501 are located on face 504 of battery 380. Alignment interfaces 501 mate with corresponding alignment interfaces provided on the inside of opening 332 of tractor 324 as battery 380 approaches complete insertion into opening 332. Alignment interfaces 501 facilitate alignment of electrical connection interface 392 with corresponding electrical connection interface on the inside of opening 332 of tractor 324. In the example illustrated, alignment interfaces 501 comprises non-circular shaped projections that protrude from face 504 and that mate within correspondingly shaped non-circular detents on the inside of opening 332. In the example illustrated, alignment interfaces 501 are triangular. In other implementations, alignment interfaces 501 and the corresponding alignment interfaces on the inside of opening 332 may have other shapes, comprise a single alignment interface, or may comprise more than two alignment interfaces. In some implementations, alignment interface 501 may comprise detents rather than projections, whereas the alignment interfaces on the inside of opening 332 comprise projections rather than detents.

Electrical connection interface 502 is configured to receive and electrically mate with an electrical connection interface in the form of a plug having a shape and configuration similar to interface 502. In the example illustrated, electrical connection interface 502 comprises an electrical receptacle having electrically conductive pins, pad or sockets and configured to mate with and receive a correspondingly shaped electrical plug, having corresponding pins, pads or sockets and projecting from the inside of opening 332. In the example illustrated, electrical connection interface 392 is configured to electrically mate with an electrical interface within opening 332 that is similar to battery charging interface 476 shown in FIGS. 11 and 12. Likewise, electrical connection interface 502 is also configured to electrically mate with battery charging interface 476. In other implementations, electrical connection interface 502 may have other shapes and other configurations, wherein electrical connection interface 502 facilitates the transmission of electrical data and electrical power to and from battery 380 using the electrical connection interface of tractor 324 or the battery charging interface 476 of battery transport 328.

As shown by FIG. 7A-7E, battery 380 further comprises several structures or mechanisms to facilitate powered insertion of battery 380 into opening 332 of tractor 324 and to facilitate secure retention of battery 380 within opening 332. battery 380 comprises a pair of mounted shafts 462 along the bottom side of battery 380 on opposite sides of channel 382. Shafts 462 are sized and located so as to be concurrently engaged by the pair of hooks 458 (shown in FIGS. 5 and 6) extending from threaded follower 452. Once hooks 458 have been pivoted so as to receive shafts 462, carriage 360 may be driven to carry and move battery 380 relative to floating support frame, along guide 448.

As further shown by FIG. 6, manual cranks 430 are each connected to an axial end of threaded lead screw 450. Manual cranks 430 facilitate manual rotation of threaded lead screws 450 and 452 translate threaded follower 452 and battery connector 456 along the respective axes 384.

Figure 7D:
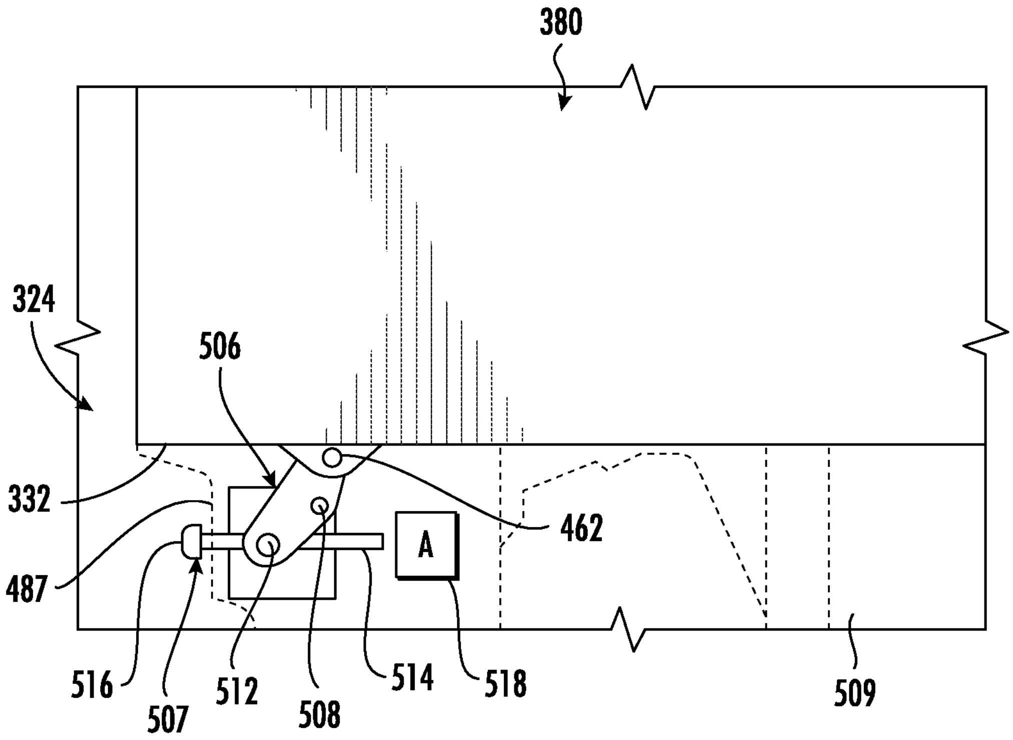
FIG. 7D is an enlarged fragmentary view of portions of the example battery of FIG. 7A.
Figure 7E:
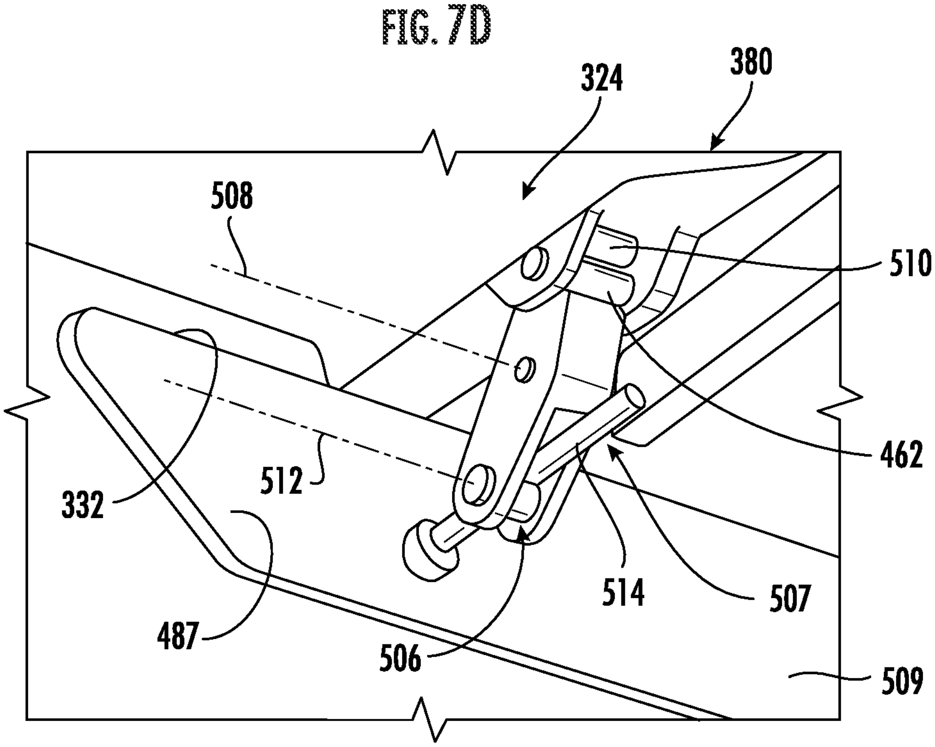
FIG. 7E is an enlarged fragmentary view of portions of the example battery of FIG. 7A.

Once battery 380 has been moved into opening 332 of tractor 324 (either through the use of manual cranks 430 or actuators in the form of powered carriage drives 464), battery 380 may be securely retained to inhibit accidental dislodgment or withdrawal. FIGS. 7D and 7E further illustrate an example of how shafts 462 may be used to facilitate retention of battery 380 within opening 332 of tractor 324. FIGS. 7D and 7E illustrate battery 380 inserted into opening 332 with latches 506 (one of which is shown) below the front of opening 332 of tractor 324 engaged with one of shafts 462. In the example illustrated, each of latches 506 extends behind a bumper 487 of tractor 324, below opening 332. Each of latches 506 is pivotably mounted to the frame or frame 509 of tractor 324 for pivotal movement about axis 508. The upper end of each latch 506 comprises a hook 510 while the lower end of each latch 506 is pivotally connected to a linear translator 507 for pivotal movement about axis 512.

Linear translation of the lower end of each latch 506 results in rotation of each latch 506 about axis 508. For example, linear movement of the lower end of latch 506 towards the rear of tractor 324 (away from front bumper 487) results in counterclockwise movement of latch 506 (as seen in FIG. 7E) about axis 508. Conversely, linear movement of the lower end of latch 506 towards the front of tractor 324 (towards front bumper 487) results in clockwise movement of latch 506 about axis 508. Prior to and during insertion of battery 380 into opening 332, linear translator 507 is actuated such that hook 510 is pivoted sufficiently towards front bumper 487 so as to be below opening 332 and not interfere with the insertion of battery 380 fully into opening 332. Once battery 380 has been fully inserted into opening 332, linear translator 507 is actuated to pivot latch 506 (in a clockwise direction) to move hook 510 in an arc towards and about the corresponding shaft 462. Hook 510 engages shaft 462 to inhibit forward movement of battery 380 through opening 332. The process is reversed when battery 380 is to be removed from opening 332 of tractor 324.

In the example illustrated, linear translator 507 comprises an externally threaded shaft 514 having threads that threadedly engage the lower end of latch 506. As seen in FIG. 7D, shaft 514 extends through from bumper 487 and terminates at a head 516 which may be engaged by a wrench or other rotational manual tool to facilitate rotation of shaft 493 and control over the positioning of latch 506. In some implementations, linear translator 507 may include a manual crank arm extending from shaft 514 in front of bumper 487. In some implementations, tractor 324 may additionally comprise a rotary actuator 518 supported by the frame or chassis 509 and connected to shaft 514, wherein the rotation of shaft 514 and the positioning of latch 506 may be controlled by a controller, such as controller associate with tractor 324.

In yet other implementations, linear translator 507 may have other configurations. For example, in some implementations, linear translator 507 may comprise a manually engageable lever to facilitate manual pivoting of latch 506. In yet other implementations, linear translator 507 may comprise an actuator in the form of a hydraulic or pneumatic cylinder-piston assembly mounted to frame 509 and pivotably connected to the lower end of latch 506. In the example illustrated, latch 506 and associated mechanisms are provided for each of shafts 462.

As schematically shown in FIG. 5, in some implementations, battery transport 328 may additionally or alternatively comprise powered carriage drives 464-1, 464-2 (collectively referred to as drives 464) to move carriages 360 (or those portions of carriages 360 that are connected to battery 380) along axes 384. In implementations where battery transport 328 comprises both manual cranks 430 and powered carriage drives 464, the manual cranks 430 and the powered carriage drives 464 may be selectively connected to the carriages 360. In the example illustrated, each of powered carriage drives 464 may comprise a drive source such as an electric motor, a pneumatically driven motor, or a hydraulic motor. In the example illustrated, the motors are operably coupled to worm gears 450 to rotatably drive worm gears 450. In implementations where the powered carriage drive 464 comprises an electric motor, such motors may be driven using electrical power supplied from a battery or battery 380 supported by transport 328.

In some implementations where powered carriage drive 464 comprises an electric motor, such motors may be driven using electrical power supplied from a power source interface (plug-in or the like) of a remote power source such as a remote power source interface of tractor 324 via an electrical cable or cord. In implementations where powered carriage Drive 464 comprises an electric motor, such motors may be driven from a dedicated electrical battery (distinct from any of battery 380 carried by transport 328) which is carried by transport 328. In such implementations, the dedicated electrical battery may be charged by battery 380 while the battery 380 is supported by transport 328 or may be charged from a separate power source.

In implementations where powered carriage drive 464 comprises a hydraulic motor, such motors may be powered from a hydraulic pump. In some implementations, the hydraulic motors may be powered with a hydraulic line connected to a hydraulic pump provided on tractor 324.

Likewise, pneumatic motors may be powered using a pneumatic hose or line connected to a pneumatic pump, such as a pump carried by tractor 324. In some implementations, such powered carriage drives 464 may be manually turned on and off via a switch provided on transport 328 or via a switch provider on tractor 324. In yet other implementations, such powered carriage rise may be turned on and off by a switch provided in tractor 324, wherein wired or wireless communication is provided between tractor 324 and the powered carriage drives 464. As will be described hereafter, in some implementations, the actuation of powered carriage drive 464 may be under the control of a controller 468.

Figure 8:
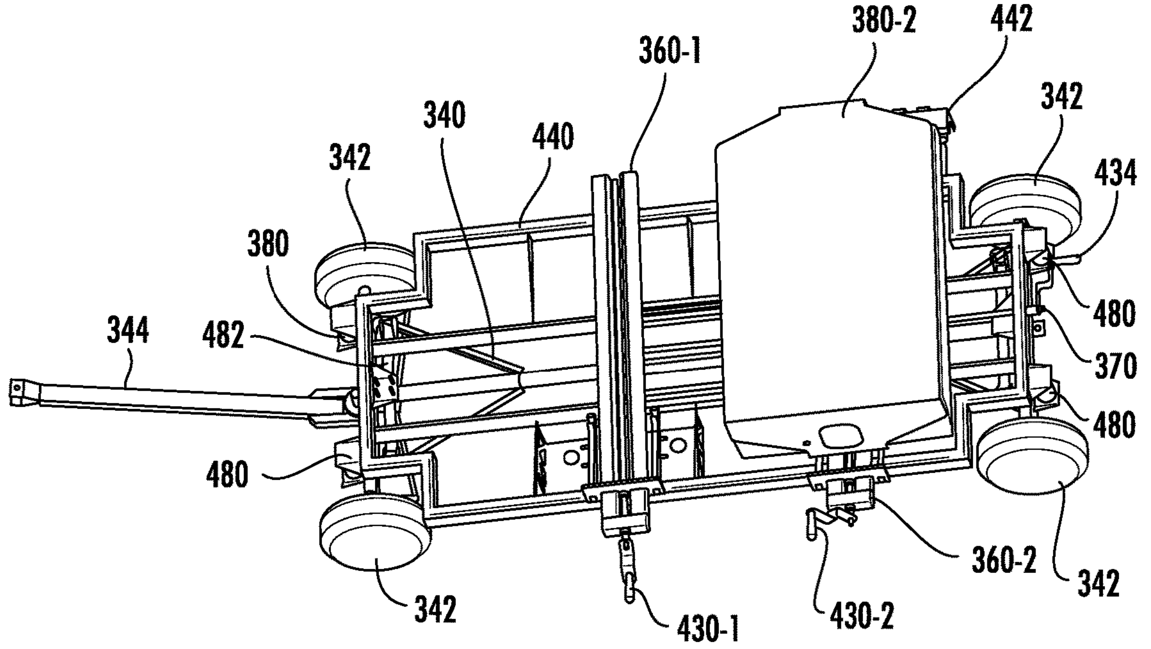
FIG. 8 is a top perspective view of the example battery transport supporting the example swappable battery.
Figure 9:
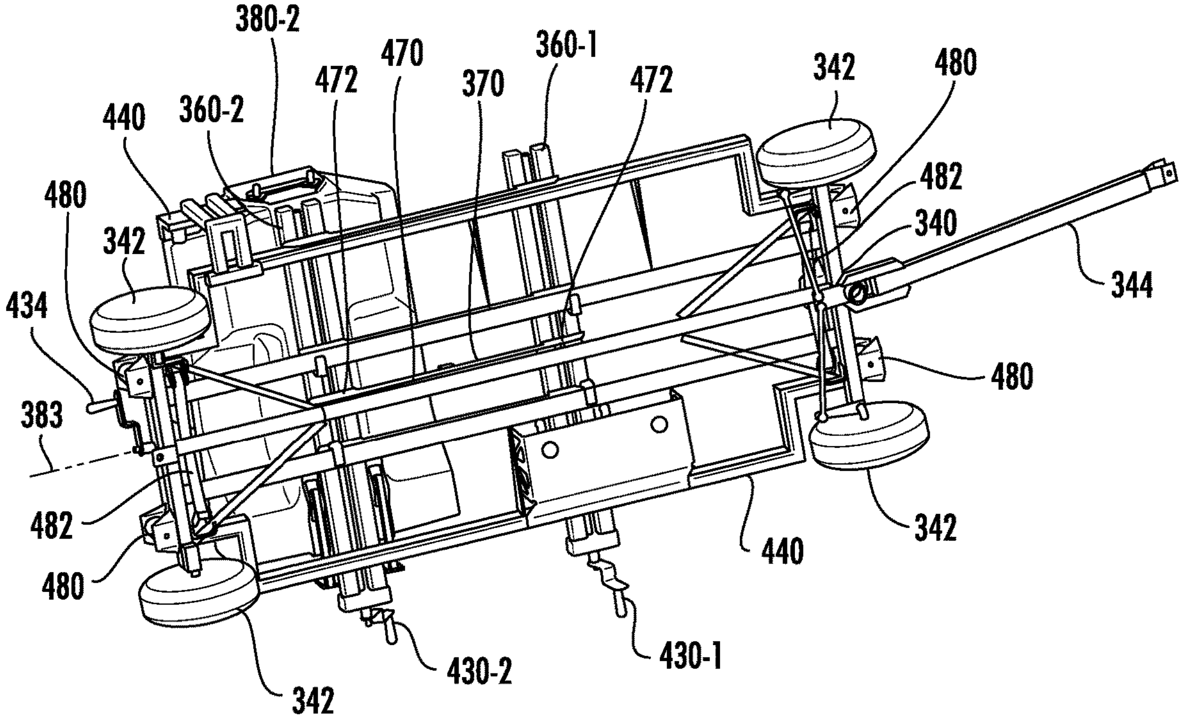
FIG. 9 is a bottom perspective view of the example battery transport and swappable battery of FIG. 8.
Figure 10:
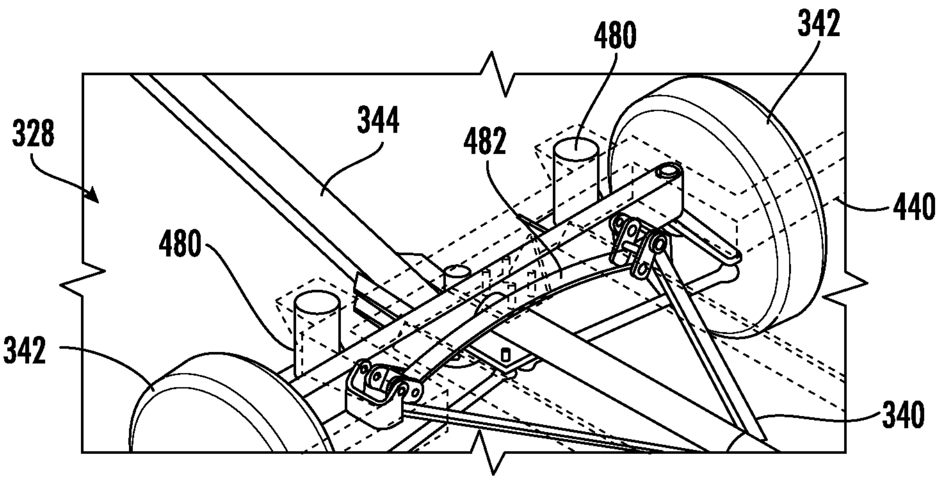
FIG. 10 is a fragmentary perspective view illustrating portions of the example battery transport of FIG. 8.

As shown by FIGS. 5, 8 and 9, locating carriage 370 is similar to one of locating carriages 270 described above except that locating carriage 370 is connected to both of carriages 360-1 and 360-24 moving both of carriages 360-1 and 360-2 in unison along axes 383. In the example illustrated, locating carriage 370 comprises a worm gear 470 rotatably supported by floating support frame 440 and threadedly engaging a worm gear follower 472 (shown in FIG. 9) of each of carriages 360. Rotation of the worm gear 470 results in linear translation of carriages 360 along axis 383.

Manual crank 434 is connected to an end portion of worm gear 470. Manual rotation of crank 434 results in rotation of worm gear 470 and linear translation of worm gear followers 472 (and the connected guides 448 of carriages 360) along axis 383.

As schematically illustrated in FIG. 5, in some implementations, battery transport 328 may additionally or alternatively comprise powered locating carriage drive 474 to move carriages 360 along axis 383. In implementations where battery transport 328 comprises both manual cranks 430 and powered locating carriage drive 474, the manual cranks 430 and the powered locating carriage drive 474 may be selectively connected to the they worm gear 470 of locating carriage 370. In the example illustrated, powered locating carriage drive 474 may comprise a drive source such as an electric motor, a pneumatically driven motor or a hydraulic motor carried by support frame 440. In the example illustrated, the motor may be operably coupled to worm gear 470 to rotatably drive worm gear 470. In implementations where the powered carriage drive 464 comprises an electric motor, such motors may be driven using electrical power supplied from a battery or battery 380 supported by transport 328.

In some implementations where powered locating carriage drive 474 comprises an electric motor, such motors may be driven using electrical power supplied from a power source interface (plug-in or the like) of a remote power source such as a remote power source interface of tractor 324 via an electrical cable or cord. In implementations where powered locating carriage drive 474 comprises an electric motor, such motors may be driven from a dedicated electrical battery (distinct from any of battery 380 carried by transport 328) which is carried by transport 328. In such implementations, the dedicated electrical battery may be charged by one of battery 380 while battery 380 are supported by transport 328 or may be charged from a separate power source.

In implementations where powered locating carriage drive 474 comprises a hydraulic motor, such motors may be powered from a hydraulic pump. In some implementations, the hydraulic motors may be powered with a hydraulic line connected to a hydraulic pump provided on tractor 324. Likewise, pneumatic motors may be powered using a pneumatic hose or line connected to a pneumatic pump, such as a pump carried by tractor 324. In some implementations, such powered carriage drives 474 may be manually turned on and off via a switch provided on transport 328 or via a switch provider on tractor 324. In yet other implementations, such powered carriage rise may be turned on and off by a switch provided in tractor 324, wherein wired or wireless communications provided between tractor 324 and the powered carriage drives 464. As will be described hereafter, in some implementations, the actuation of powered locating carriage drive 474 may be under the control of a controller 468.

Battery charging system 442 comprises a battery interface 476 for electrical connection to a battery 380 while the battery 380 is supported by carriage 360-2. battery charging interface 476 includes plugs, pins, ports, or receptacles for mating with corresponding interface components of battery 380. battery charging interface 476 may include an electrical cord or an electrical connection for connection to an electrical cord that is to be connected to an external power source, such as a power source connected to a power grid or a larger remote battery. battery charging system 442 facilitates the charging of a battery on transport 328, possibly prior to the carried battery and transport 328 being delivered to a remote field/worksite/forest for battery swapping. In the example illustrated, battery interface 476 may remain connected to the carried battery 380 (as shown 9) during transport of battery transport 3282 a remote field/worksite/forest and while battery transport 328 resides in a field/worksite/forest, protecting battery interface 476 and the electrical interface components of battery 380 from dust, dirt, water, and the elements.

Carriage suspension system 444 facilitates adjustment to the roll, pitch, and height of the floating support platform 440 and the supported carriages 360 to facilitate more precise alignment of carriages 360 to opening 332 of tractor 324. Such adjustments facilitate matching the roll, pitch, and height of the tractor for which a battery is being swapped. As shown by FIGS. 4, 5 and 8-10, in the example illustrated, carriage suspension system 444 comprises airbags 480 and leaf springs 482. In the example illustrated, airbags 480 are captured between support frame 340 and floating support frame 440 at each of the four corners of transport 328. Leaf springs 482 are located at a front and a rear of transport 328, near the front and rear axles of wheels 342, extending across axis 383. In some implementations, the roll, pitch, and height adjustments may be manually achieved with an air pressure regulator supported by support frame 340. In some implementations, such roll, pitch, and height adjustments may be made with electronic air valves and an inertial measurement unit mounted to support frame 340 or support frame 440. In other implementations, transport 328 may alternatively utilize leveling screw jacks in place of airbags 480.

In some implementations, carriage suspension system 444 may be part of a larger alignment system which comprises sensors 484, 486, 488 and 490 as well as controller 468 and/or controller 490. Sensors 484, 486 and 488 comprise sensors mounted to our supported by tractor 324. Sensors 484, 486 and 488 are configured to sense the relative positioning of opening 332 and transport 328. Sensor 489 comprise a sensor carried by transport 328 that is configured to sense the relative positioning of opening 332 and transport 328. In some implementations, sensors 484, 486, 488 and 490 comprise optical sensors such as cameras. In some implementations, such sensors may comprise infrared sensors, light detection and ranging (LIDAR) sensors and the like. Sensors 484, 486, 488 and 490 may provide signals, indicating the relative positions, to controller 468 and/or controller 490.

Controllers 468 and 490 each comprise a processing unit that follows instructions contained in a non-transitory computer-readable medium, such as an application-specific integrated circuit, or such as a processor that follows instructions contained in software or code. Controller 468 is carried by transport. Controller 490 is provided as part of tractor 324. In yet other implementations, controller 490 may be remote from tractor 324 and transport 328, in communication with tractor 324 and/or transport 328.

Controller 468 and/or controller 490 utilizes the signals from the sensors to determine the current relative positioning and alignment of opening 332 of tractor 324 and one of carriages 360 and/or a battery supported by transport 328. Based upon the determined current state of alignment and positioning, controller 468 and/or controller 490 outputs control signals to powered locator carriage drive 474 and carriage suspension system 444 (the valves controlling the pressure inflation level of airbags 480 or an actuator which controls a screw leveling jack) to align opening 332 with a carriage that is to receive a battery to be removed from tractor 324 or to align opening 332 with a carriage and its supported battery 380 that is to be loaded into tractor 324. Once sufficient alignment has been achieved, as indicated by the signals from the sensors, controller 468 and/or controller 490 may output control signals causing the powered carriage drive 464 of the particular carriage to move the battery connector into connection with the battery to be unloaded from tractor 324 and thereafter withdraw the battery from tractor 324 or to move the battery connector such that the connected batteries loaded through opening 332 into tractor 324. In such a manner, the unloading and loading of battery 380 may be automated.

In some implementations, system 320 may omit powered carriage drives 464, wherein a display or other indicator may indicate to an operator that sufficient alignment has been achieved, wherein the operator then actuate the crank 362 of the carriage that is aligned with the opening 332 of tractor 324 to unload or load a battery. In some implementations, system 320 may omit powered locating carriage drive 474, wherein a display or other indicator may indicate the degree of alignment between opening 332 and a particular one of carriages 360/battery 380, wherein the operator may manually move the carriages using crank 434.

In some implementations, locating carriage 370 may be omitted, wherein a display or other indicator may indicate the degree of alignment between opening 332 and a particular one of carriages 360/battery 380, wherein the operator may move the entire transport 328 relative to tractor 324 to achieve a desired degree of alignment. In some implementations, the entire transport 328 may be moved relative to the opening 332 of tractor 324 using a separate vehicle, such as a separate tractor, truck, or the like. In some implementations, transport 328 may additionally comprise its powered drive 492 (schematically shown in FIG. 4) for driving wheels 342 to facilitate alignment of a selected one of carriages 360 and the opening 332 of tractor 324. For example, transport 328 may include an electric motor, powered by a battery 380 residing on transport 328, for driving the front wheels 342, the rear wheels 342 or both in small increments for alignment. The electric motor may be controlled by a manually operated switch or control controlled by an operator in tractor 324 or standing next to transport 328. In some implementations, the electric motor which drives the entire transport 328 may be controlled by controller 468 and/or controller 490 based upon signals from sensors 484, 486, 488 and/or 489.

Figure 11:
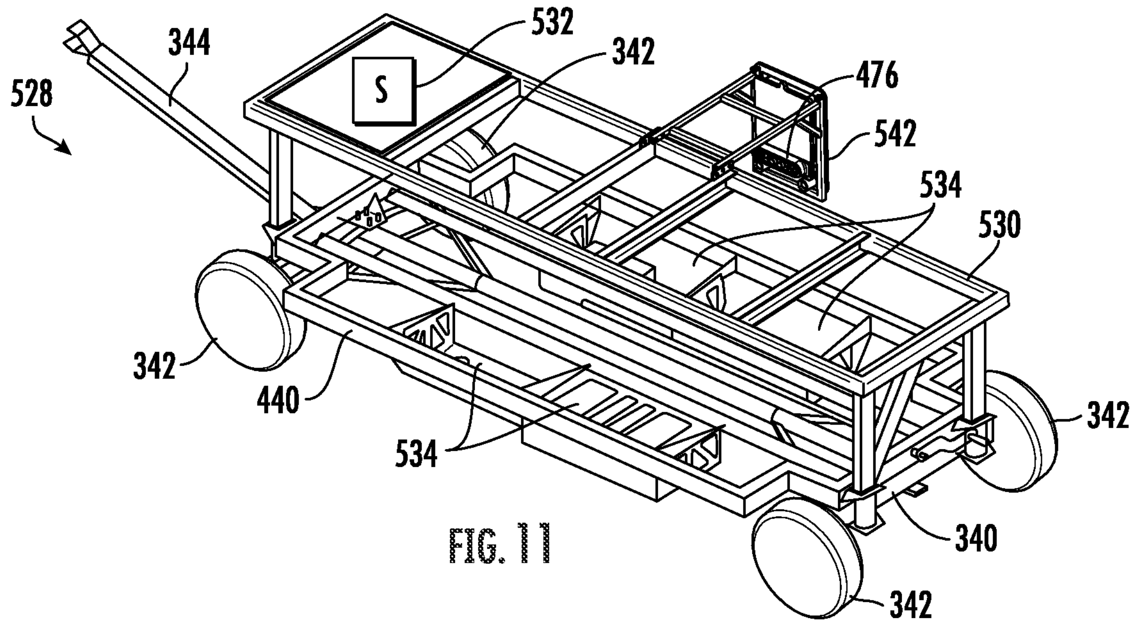
FIG. 11 is a top perspective view of an example battery transport.

FIG. 11 is a perspective view illustrating portions of an example battery transport 528. battery transport 528 is similar to battery transport 328 described above except that battery transport 528 additionally comprises top deck 530, scale 532 and racks 534. battery transport 528 additionally comprises battery charging system 542 in place of battery charging system 442. Those remaining components of battery transport 528 which correspond to components of transport 328 are numbered similarly in FIG. 11 and/or are shown in FIGS. 4-10.

Top deck 534 is supported by support frame 340 above the battery carriages 360 (shown in FIG. 5). Top deck 534 is spaced from the battery carriages 360 by height greater than the height of battery 380 to be carried by the battery carriages 360, allowing battery 380 to be inserted between carriages 360 and top deck 534. Top deck 534 may provide a mobile worktable that may be used for such operations as packing, weighing, and recording fruit harvest, infield/worksite/forest repairs or equipment or a break table for field/worksite/forest works. In some implementations, top deck 530 may include electric outlets (powered by the battery 380 onboard transport 528). In some implementations, the electrical outlets may facilitate the recharging of smart phones, running my quaver hotplate on the like for field/worksite/forest worker meals. In some implementations, top deck 530 may include lighting booms.

Scale 532 is carried by top deck 530. Scale 532 facilitates the weighing of produce. In other implementations, scale 532 may be omitted. Storage racks 534 are supported by support frame 340 below floating support frame 440. Storage racks 534 provide for storage of additional equipment or the like. In some implementations, a portion of the storage space provided by storage racks 534 may be utilized to store a separate battery for powering those electrical components of transport 528, rather than drawing power from the onboard battery 380. In some implementations, such storage racks 534 may be omitted.

Figure 12:
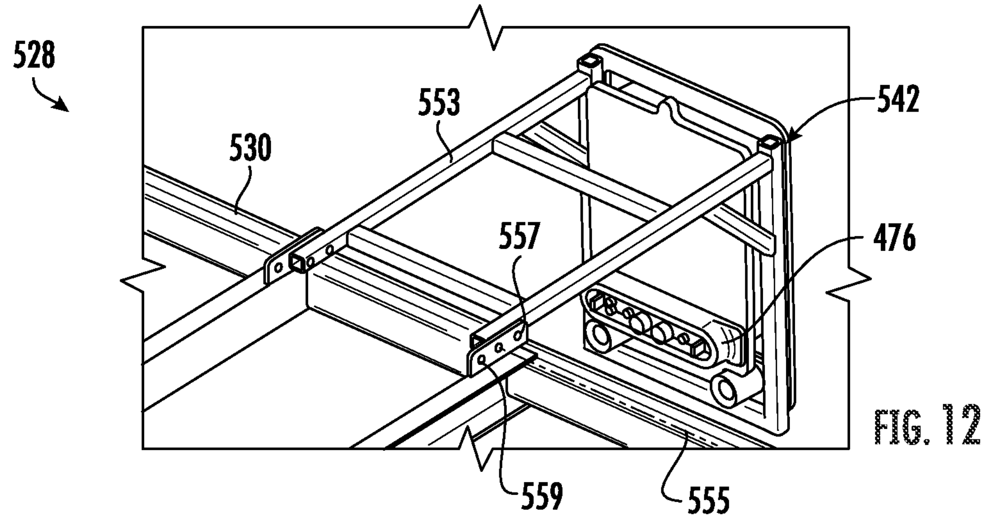
FIG. 12 is a fragmentary perspective view illustrating portions of the example battery transport of FIG. 11.

As shown by FIG. 12, battery charging system 542 is similar to battery charging system 442 described above except that battery charging system 542 is suspended from top deck 530. battery charging system 542 comprises a battery interface 476 for electrical connection to a battery 380 while the battery 380 is supported by carriage 360-2. battery charging interface 476 includes plugs, pins, ports, or receptacles for mating with corresponding interface components of battery 380. battery charging interface 476 may include an electrical cord or an electrical connection for connection to an electrical cord that is to be connected to an external power source, such as a power source connected to a power grid or a larger remote battery. battery charging system 542 facilitates the charging of a battery on transport 328, possibly prior to the carried battery and transport 328 being delivered to a remote field/worksite/forest for battery swapping. In the example illustrated, battery interface 476 may remain connected to the carried battery 380 (as shown 9) during transport of battery transport 328 to a remote field/worksite/forest and while battery transport 328 resides in a field/worksite/forest, protecting battery interface 476 and the electrical interface components of battery 380 from dust, dirt, water, and the elements.

In some implementations, battery interface 476 is combined with off-the-shelf charging electronics to facilitate battery charging on-board daddy transports. Utilizing the same charging power electronics as deployed on the tractor 324 minimizes cost and simplifies maintenance and logistics. Alternately, such charging electronics can be adapted to the specific power levels and power types (e.g., single phase vs. three phase AC power) found on the farm.

In some implementations, battery charging system 542 may movably support battery interface 476 for movement between a charging position and a retracted or withdrawn position. In the example illustrated, battery interface 476 is cantilevered by support 553 which is pivotable about an axis 555. Support 553 may be retained in either the extended charging position (shown in FIG. 12) or a retracted or withdrawn position in which battery interface 476 overlies the rest of transport 52 8×10 which may be inserted through aligned openings 557 (for the charging position) or aligned openings 559 (for the retracted or withdrawn position). Although illustrated as being manually movable between the charging position and the withdrawn position, battery interface 476 may alternatively be moved by a powered actuator which may move the positioning of battery interface 476 in response to a manual input or in response to control signals from a controller provided on transport 528 or in the tractor 324.

FIGS. 13A-13H illustrate an example operation using battery swap system 320. As should be appreciated, the example operation shown in such figures may likewise be applied utilizing battery transport 5 to 8 in place of battery transport 328 or utilizing battery transports 28, 128 or 228 described above. The example operation may likewise be carried out with other types of tractors are vehicles having battery receiving cavities or bays.

Figure 13A:
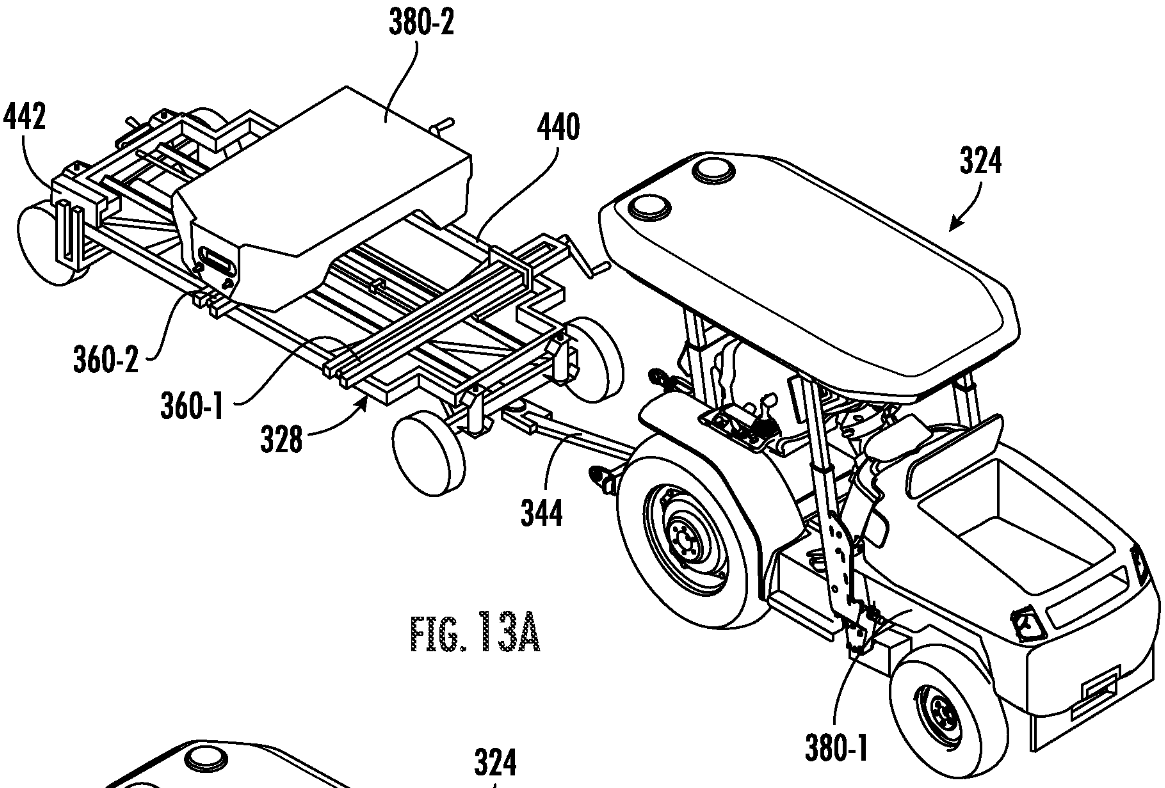
FIG. 13A is a perspective view illustrating the example battery transport system of FIG. 4 with the example tractor towing the example battery transport supporting an example swappable battery.

As shown by FIG. 13A, tractor 324, using battery power supplied by onboard battery 380-1, tractor 324 may tow battery transport 328, carrying a charged battery 380-2, to a field/worksite/forest or other remote location. Thereafter, the tractor 324 may be disconnected from transport 328 and utilized to carry out a field/worksite/forest operation.

Figure 13B:
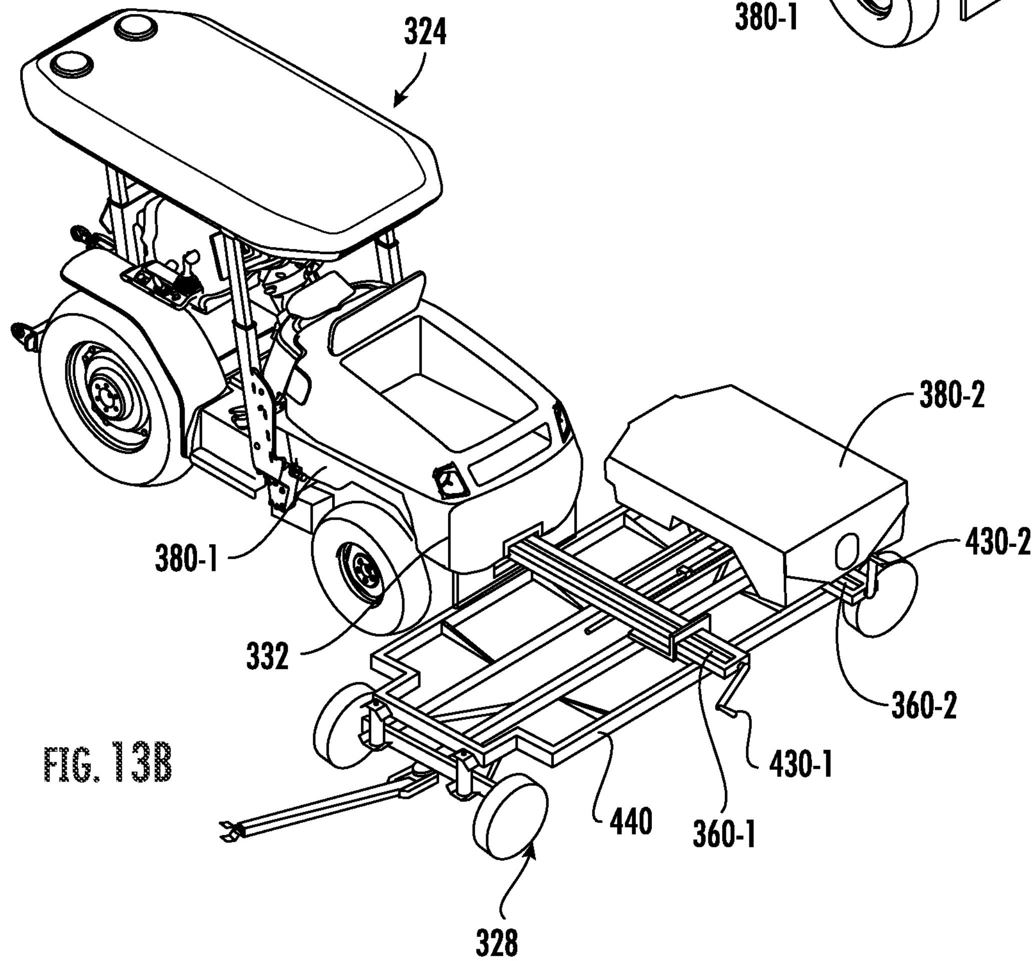
FIG. 13B is a perspective view illustrating the example battery transport positioned in front of the example tractor.

As shown by FIG. 13B, upon the operator being notified that the current charge state of battery 380-1 is low, the operator may discontinue the field/worksite/forest operation and drive tractor 324 to a position alongside transport 328. Tractor 324 may be driven to an approximate aligned position with carriage 360-1. Thereafter, based upon signals received from sensors 484, 486, 488, and 489 (when provided), controller 468 and/or controller 490 may output control signals to powered carriage locating drive 474 (or powered drive 492 when provided) to enhance alignment of carriage 360-1 with opening 332 of tractor 324. Based upon signals from sensors 484, 486, 488, and 489, controller 468 and/or controller 490 may further output control signals to carriage suspension system 444 to adjust the roll, pitch or height of carriage 360-1 for enhanced alignment with opening 332 of tractor 324. As discussed above, in some implementations, one or more of the automated alignment procedures may alternatively be manually carried out through the use of manual crank 434, with or without guidance provided by signals from sensors 484, 486, 488, and 489.

Figure 13C:
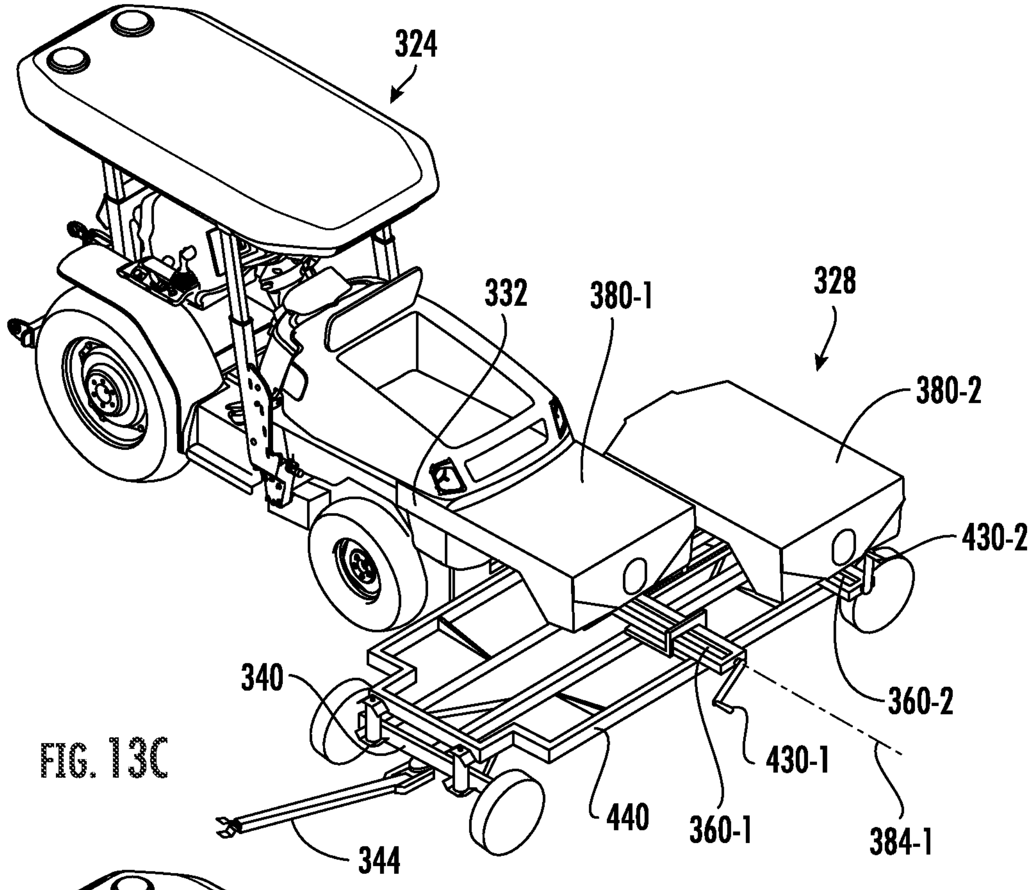
FIG. 13C is a perspective view illustrating withdrawal of an example battery from the example tractor onto the example battery transport.
Figure 13D:
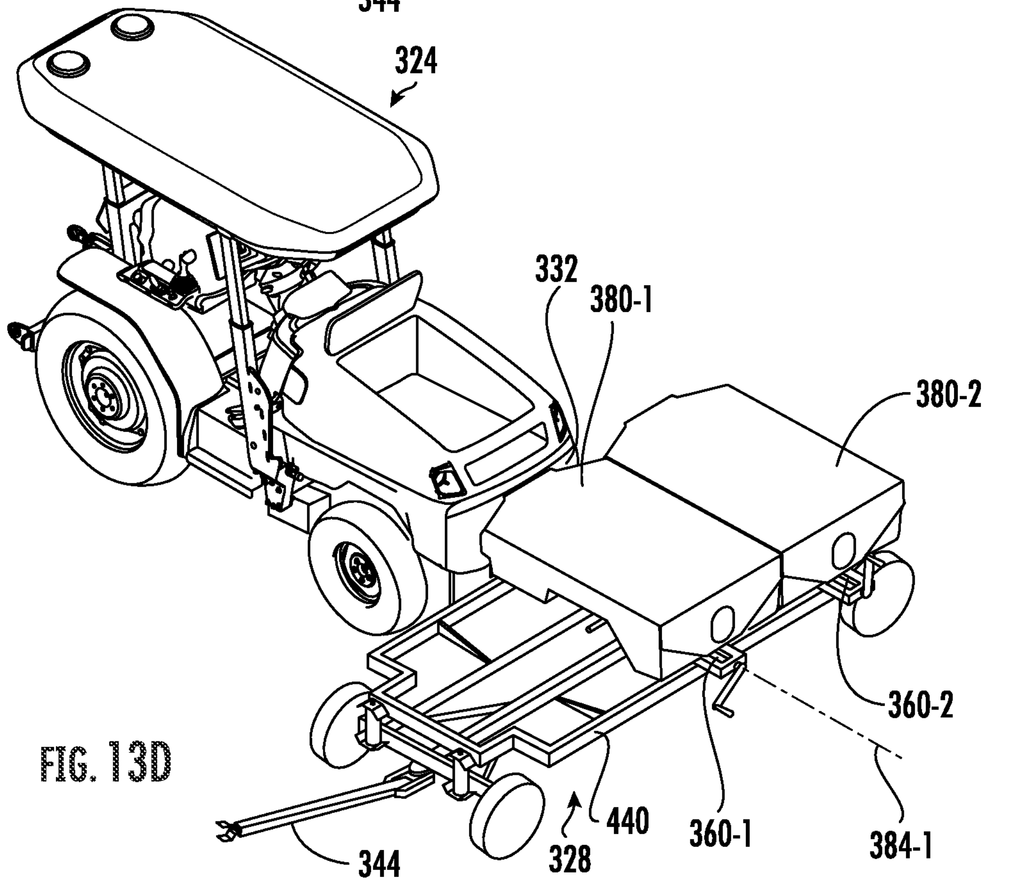
FIG. 13D is a perspective view illustrating the complete withdrawal of the example battery from the example tractor onto the example battery transport.

As shown by FIGS. 13C and 13D, once sufficient alignment has been achieved, battery connector 456 may be moved along axis 384-1 so as to engage the battery 380-1 within tractor 324. In some implementations, hooks 458 are pivoted into engagement with shafts 462 of battery 380-1. Once such hooks have been engaged or the battery is otherwise connected to carriage 360-1 (worm gear follower 452 of carriage 360-1), carriage 360-1 is driven in the reverse direction to withdraw the battery 3-1 from tractor 324 and onto battery transport 328. As described above, in some implementations, the movement of carriage 360-1 may be carried out using powered carriage drives 464. Alternatively, the movement of carriage 360-1 may be achieved using manual crank 430-1.

Figure 13E:
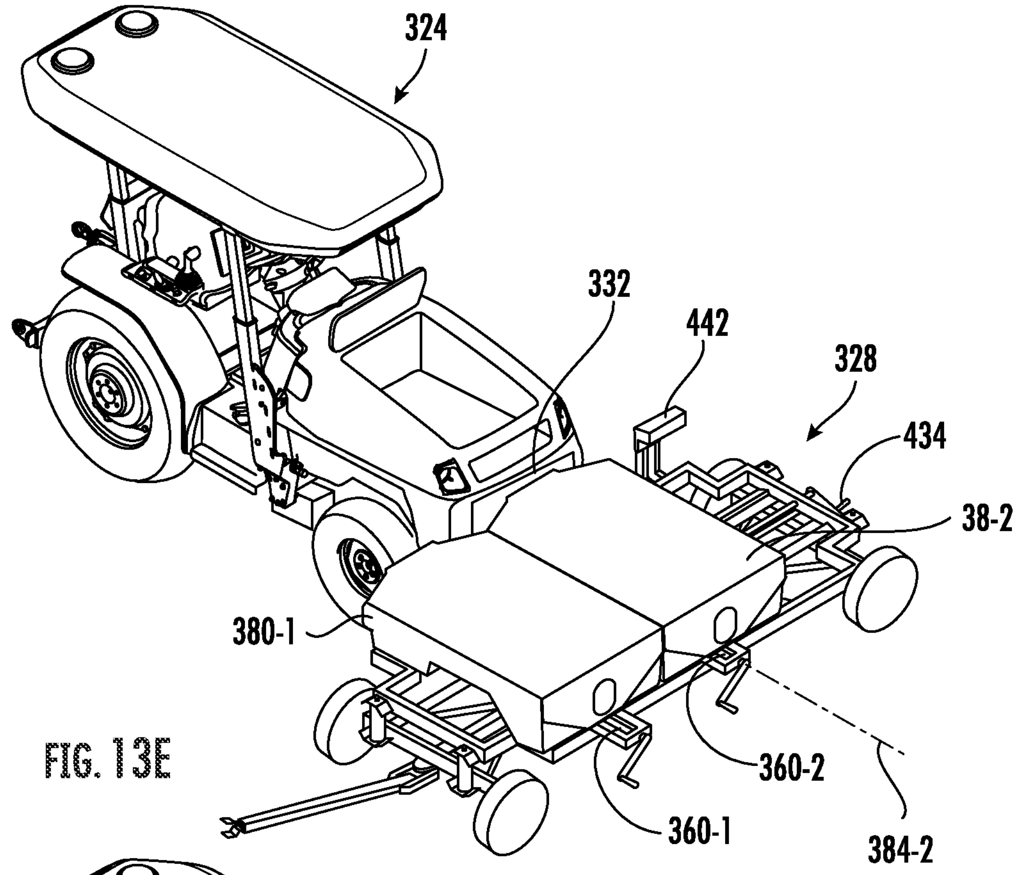
FIG. 13E is a perspective view illustrating positioning of the example swappable battery in front of the example tractor.

As shown by FIG. 13E, following withdrawal of battery 380-1, carriage 360-2 may be aligned with opening 332 of tractor 324. In some implementations, controller 468 and/or controller 490 may output control signals to powered locating carriage drive 474 to move carriage 360-2 into alignment with opening 332. In some implementations, an operator might move carriage 360-2 into alignment with opening 332 using manual crank 434. Such alignment of carriage 360-2 with opening 332 does not require repositioning of tractor 324 or transport 328. Alternatively, in implementations where carriage 370 is omitted, tractor 324 may be relocated relative to transport 328 or transport 328 may be located relative to tractor 324. As described above, in some implementations, powered drive 492 may be used to relocate or reposition transport 328 relative to opening 332 of tractor 324.

To facilitate enhanced alignment of carriage 360-2 and the supported charged battery 380-2 with opening 332, signals from sensors 484, 486, 488, and 489 may use by controller 468 and/or controller 490 to control powered carriage locating drive 474 (when provided). Such signals may be further utilized by controllers 468 and/or 492 output control signals to carriage suspension system 444 to adjust the roll, pitch, or height of carriage 360-2 for enhanced alignment with opening 332 of tractor 324.

Figure 13F:
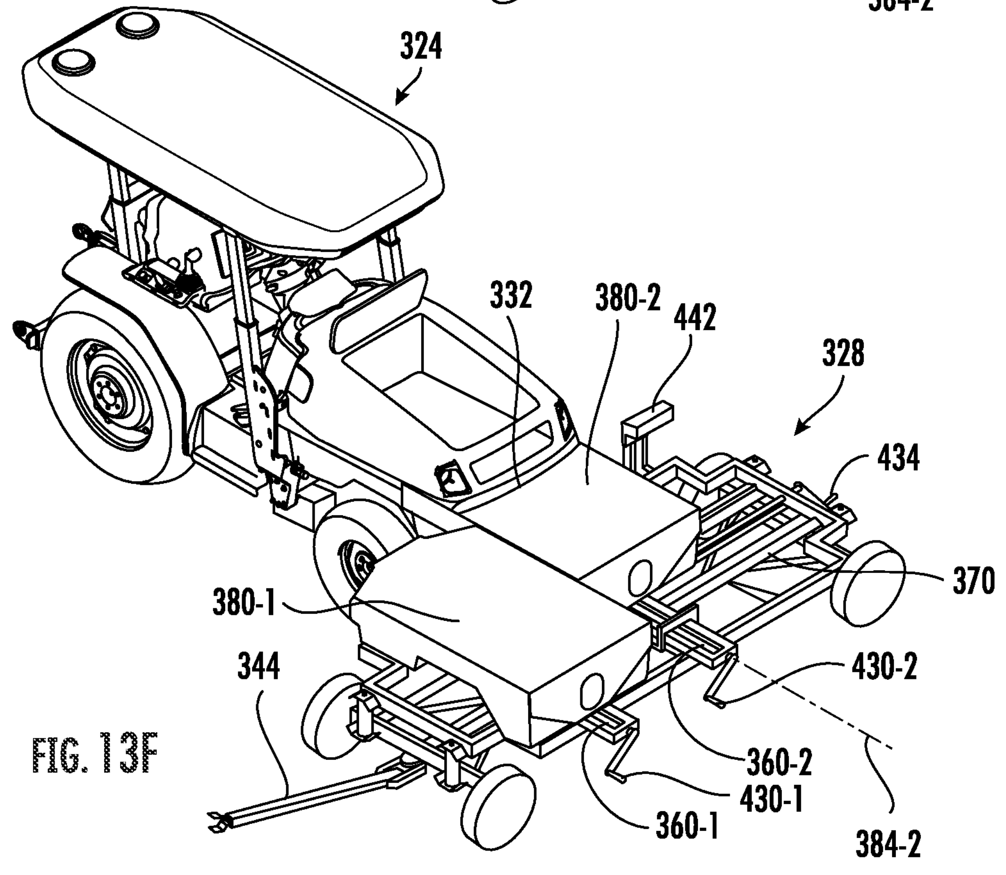
FIG. 13F is a perspective view illustrating insertion of the example swappable battery into the example tractor.
Figure 13G:
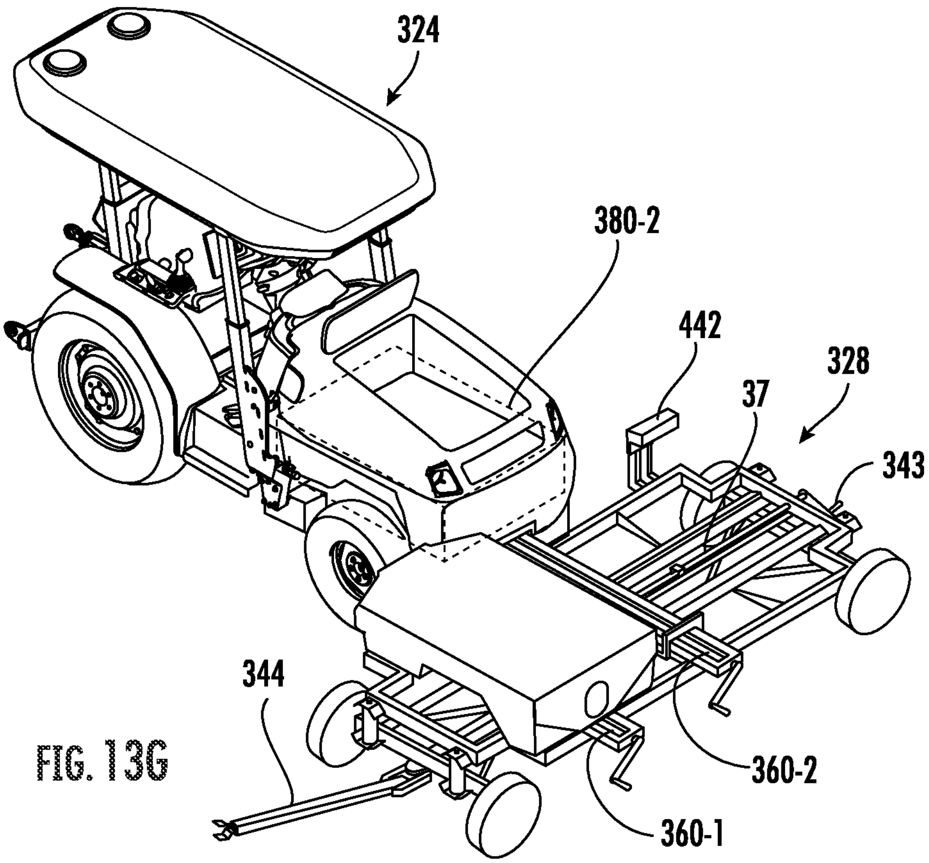
FIG. 13G is a perspective illustrating complete insertion of the example swappable battery into the example tractor.

As shown by FIGS. 13F and 13G, once sufficient alignment has been achieved, battery connector 456 of carriage 360-2 may be moved along axis 384-2 so as to move the battery 380-2 through opening 332 and into tractor 324, potentially into engagement with the battery interface 34 of tractor 324. Once battery 380-2 has been received within tractor 324, carriage 360-2 is disengaged from battery 380-2. In some implementations, hooks 458 are pivoted out of engagement with shafts 462 of battery 380-2. Once such hooks have been disengaged or the battery is otherwise disconnected from carriage 360-2, carriage 360-2 is driven away from tractor 324. As described above, in some implementations, the movement of carriage 360-2 may be carried out using powered carriage drive 464-2. Alternatively, the movement of carriage 360-2 may be achieved using manual crank 430-2.

Figure 13H:
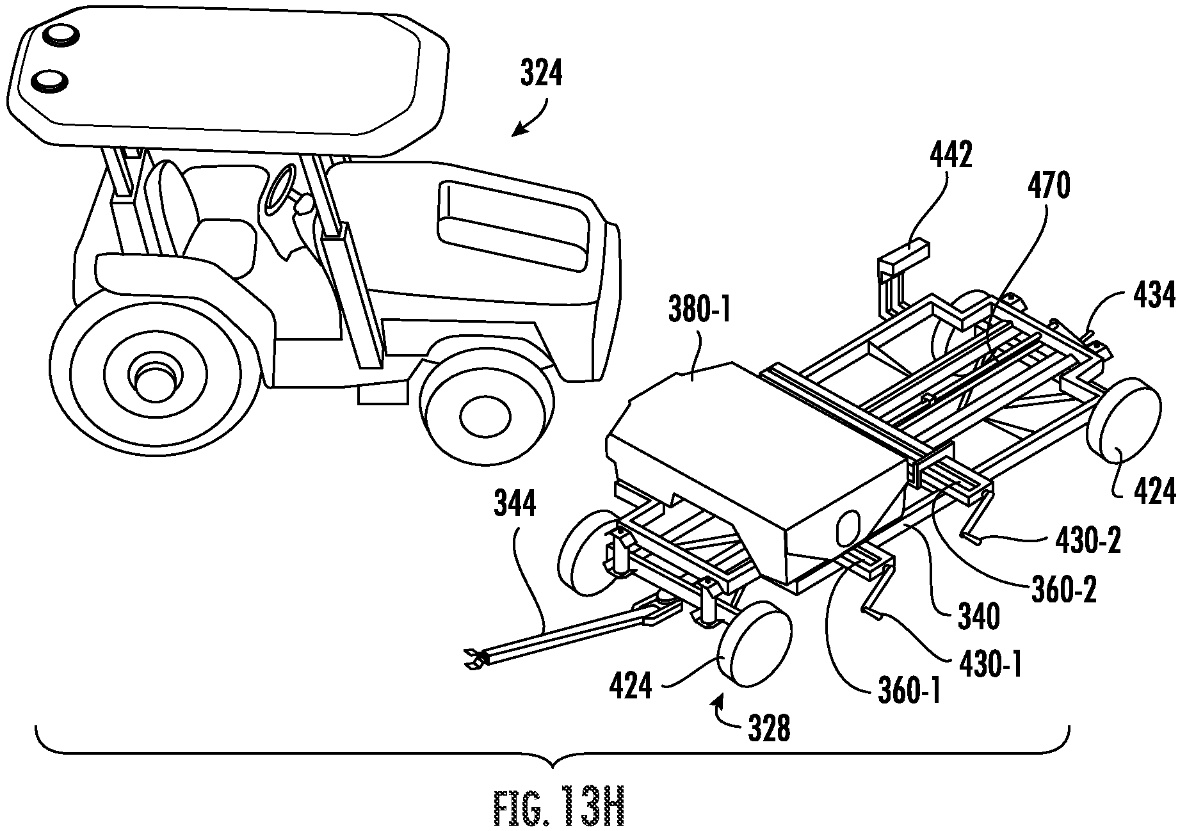
FIG. 13H is a perspective illustrating the example tractor with the inserted swappable battery and the example battery transport supporting the example battery previously removed from the tractor.

As shown by FIG. 13H, once the newly charged battery 380-2 has been loaded into tractor 324, tractor 324 may be moved away from battery transport 328, ready for further field/worksite/forest operations. In some implementations, battery charging station 442 (or battery charging station 542 when transport 528 is used) is located such that either —carriage 360-1 may be selectively positioned opposite to or in alignment with battery charging station 442/542. In such implementations, carriage 360-1, supporting the newly withdrawn and discharged battery 380-1, may be moved along and relative to support frame 340 to position the battery 380-1 in alignment with interface 476. Thereafter, the battery 380-1 may be moved by battery carriage 360-1 towards battery charging station 442 until interface 476 mates with the battery charging interface of battery 380-1 to electrically connect the battery 380-1 with battery charging station 442. At such time, transport 328 may be moved to a charging station or charging infrastructure where battery 380-1 may be charged while on transport 328 to ready battery 380-1 for a subsequent swap with battery 380-2, currently being used by tractor 324.

In some implementations, the battery transports 328, 528 may further comprise a cellular modem supported by the support frame 340 to output communication signals indicating a level of charge of a battery supported by the battery transport 328, 528. In some implementations, transport 328, 528 may further comprise a global positioning system receiver supported by the support frame 340 to output global positioning system signals indicating a geolocation of the battery transport. In such implementations, the battery transports could be designed to be integrated into single or multi-farm level asset tracking and operational planning schemes. Integration of a cellular modem, GPS receiver, and controller on-board the battery transport would enable it to communicate both its location and the state of charge of the battery currently on board the battery transport. This enables continuous tracking of battery location as it moves from tractor to transport. It also enables a comprehensive understanding of energy flow into and out of all of the batteries bellowing to one farming operation. When integrated with tractor tracking, this enables both planning and optimization of tractor and battery transport deployments to achieve farm operational objectives.

The above-described battery swap systems increase operating time in or at the field/worksite/forest for tractor 324. The above-described battery swap systems further reduce time spent driving back and forth to charging infrastructures. Example battery swap systems may minimize travel between the field/worksite/forest and barn, rendering such example battery swap systems ideal for operations where the field/worksite/forest is distant from the barn or equipment depot. The above-described battery swap systems facilitate flexible deployment of battery swap capabilities to multiple locations as needed and as operations evolve over time.

FIGS. 14-25 illustrate portions of an example battery swap system 520. System 520 is similar to system 320 except system 520 comprises the example tractor 524 and the example swappable battery 580 (shown in FIG. 16) which form an example front battery swap system 521. Front battery swap system 521 facilitates the frontloading of the swappable battery 580 through a forward-facing front opening of tractor 524 into a battery receiving cavity located in a front chassis of tractor 524. Because system 521 facilitates loading and withdrawal of a battery transversely between the front tires of the tractor, through the front of the tractor, rather into a side of the tractor or from underneath the tractor, the battery may be supported at a lower position, closer to the ground, providing the tractor with a lower center of gravity for enhanced towing and maneuverability.

In the example illustrated, front battery swap system 521 facilitates use of a larger battery (with a greater number of battery submodules or battery subunits) within the given available space to increase the electrical power available to tractor 524. Power demands and power consumption by tractor 524 may be high. Front battery swap system 521 has an architecture that facilitates use of the battery housing itself as part of the exterior outer sides of the tractor itself. In the example illustrated, the battery housing itself may form at least portions of wheel wells adjacent the front tires of the tractor. In the example illustrated, the battery includes battery submodules, contained within the housing, that both overlie and extend directly in front of the front tires. As should be appreciated, in some implementations where tractor 524 comprises tracks for propelling tractor 524, the battery housing may form wells about the tracks and the battery submodules may both overlie and extend directly in front of the tracks.

Figure 14:
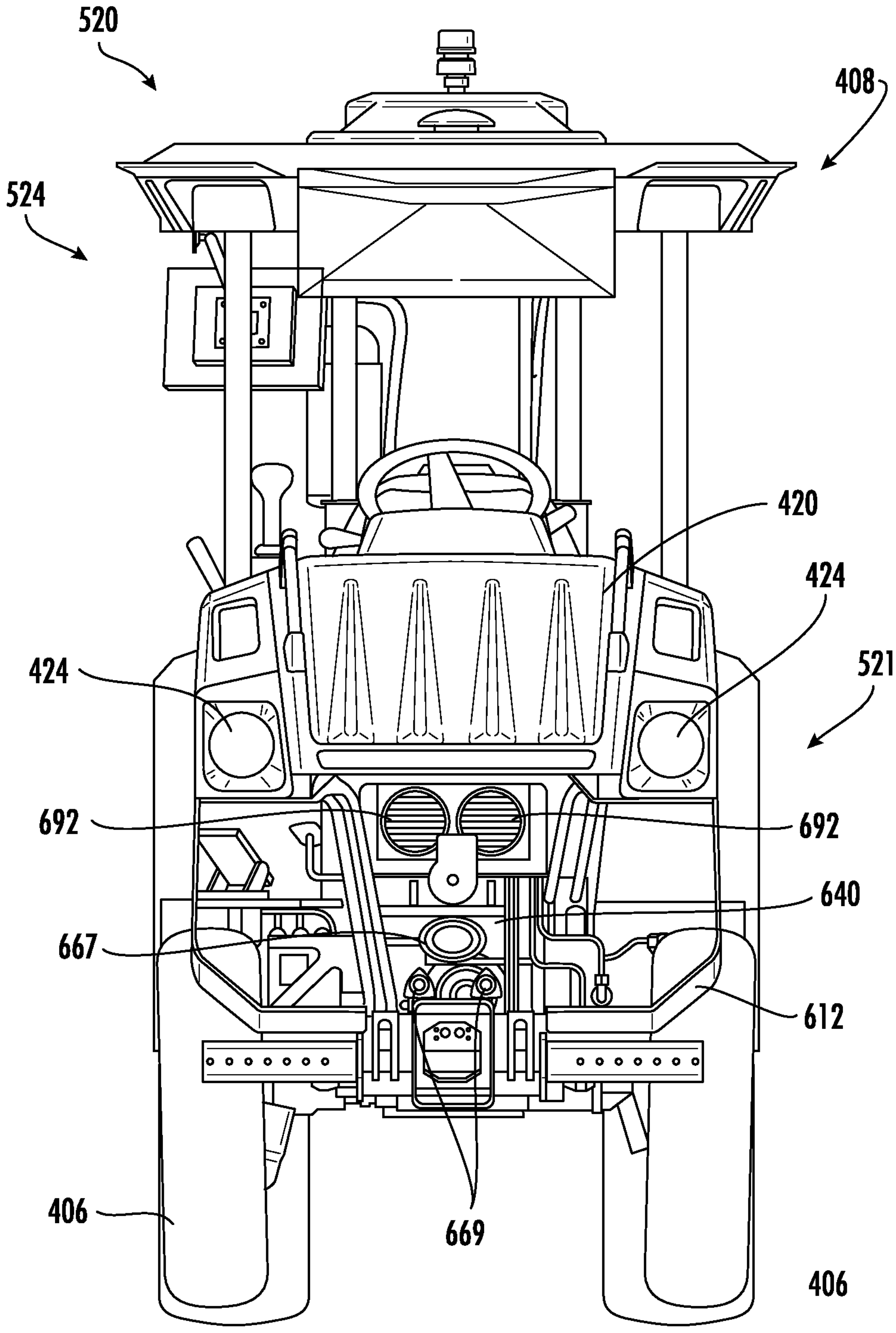
FIG. 14 is a front view illustrating an example tractor of an example battery swap system prior to insertion of a swappable battery.
Figure 15:
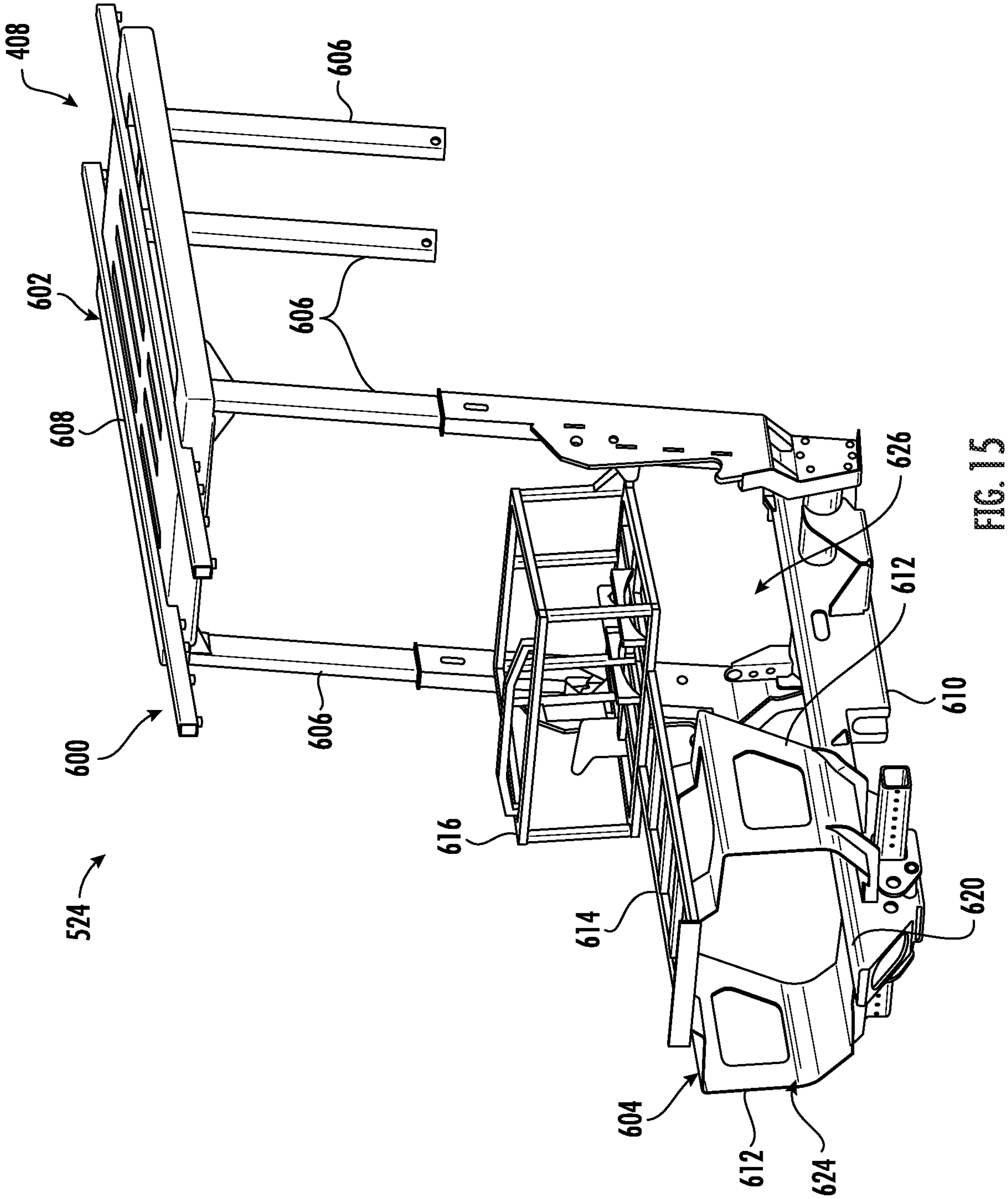
FIG. 15 is a perspective view illustrating an example frame of the example tractor of FIG. 14.

FIGS. 14 and 15 illustrate tractor 524 with battery 580 (shown in FIG. 16) removed. Batteries 580 may be transported and swapped with respect to tractor 524 using battery transport 328 described above. Tractor 524 is similar to tractor 324 described above. Those portions of tractor 524 which correspond to portions of tractor 324 are numbered similarly or are shown in FIG. 4.

FIG. 15 illustrates portions of a frame 600 of tractor 524. Frame 600 comprises cab frame 602 and front chassis frame 604. Cab frame 602 forms the framework of supporting posts 606 and roof 608 of cab 408.

Front chassis frame 604 comprises center beam 610, side supports 612, cargo bed framework 614 and console framework 616. Center beam 610 extends along a longitudinal centerline of front chassis 604 and provides a n upwardly facing horizontal track 620 which guides movement of battery 308 along center beam 610 during insertion of battery 580 and withdrawal of battery 580.

Side supports 612 have lower ends coupled to center beam 610 and upper end portions coupled to cargo bed framework 614. Side supports 612 cooperate with center beam 610 and cargo bed framework 614 to form a forward-facing mouth 624 which lies in front of a battery receiving cavity 626. As shown by FIG. 14, side supports 612 outwardly project to locations directly in front of front tires 406 such that mouth 624 also directly extends in front of the upper portions of front tires 406. Mouth 624, forming a front opening for the cavity 626, underlies headlights 424 (shown in FIG. 14) and cargo bed 420. Side supports 612 terminate in front of front wheels 406 to form a generally open space or volume longitudinally extending from side supports 612 to regions rearward of front tires 406, facilitating the at least partial forming of wheel wells by an inserted battery. As shown by FIG. 4, tractor 324 includes similar side supports 612.

Cargo bed framework 614 forms a base or underlying structure for supporting cargo bed 420. The floor cargo bed framework 614 overlies battery receiving cavity 626 and overlies battery 580 when received within cavity 626. Console framework 616 forms an outer supporting structure for the electronics and control console of tractor 524 which extends along a front end of cab 408. Console framework 616 is connected to cargo bed framework 614 and is further supported by posts 606 of cab frame 602.

Figure 16:
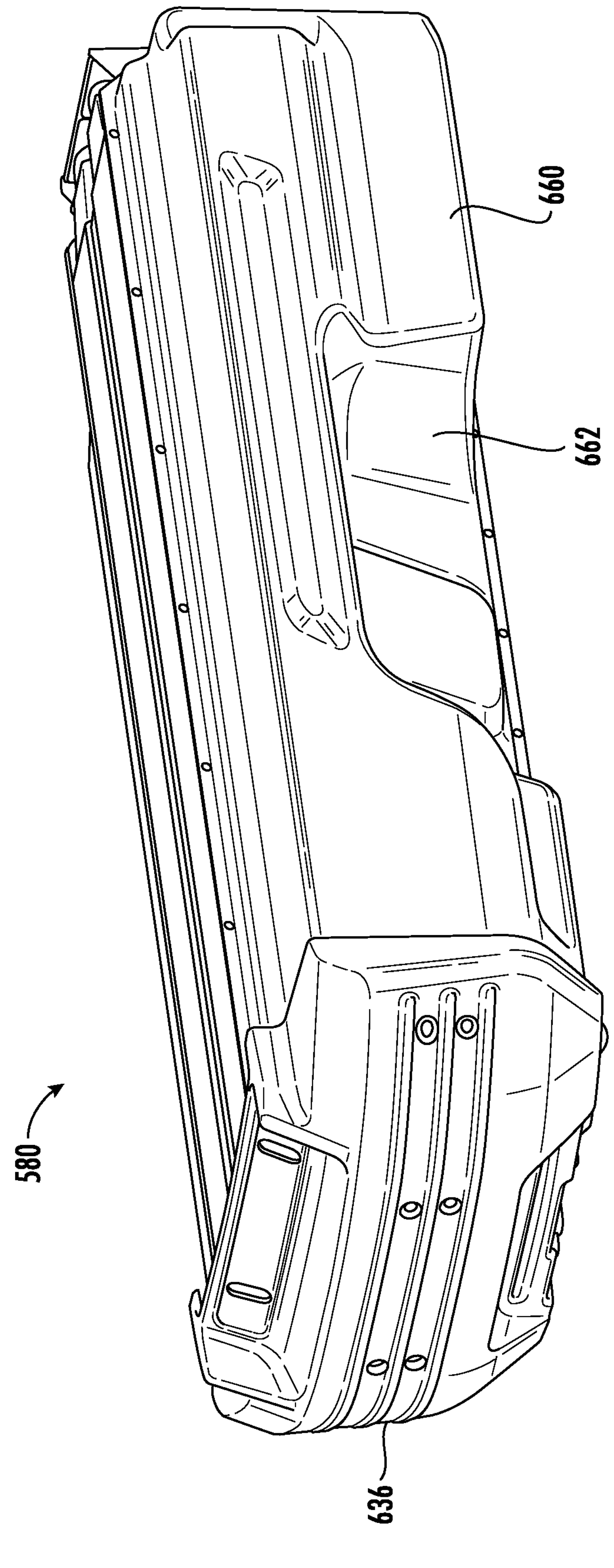
FIG. 16 is a front perspective view of an example swappable battery.
Figure 17:
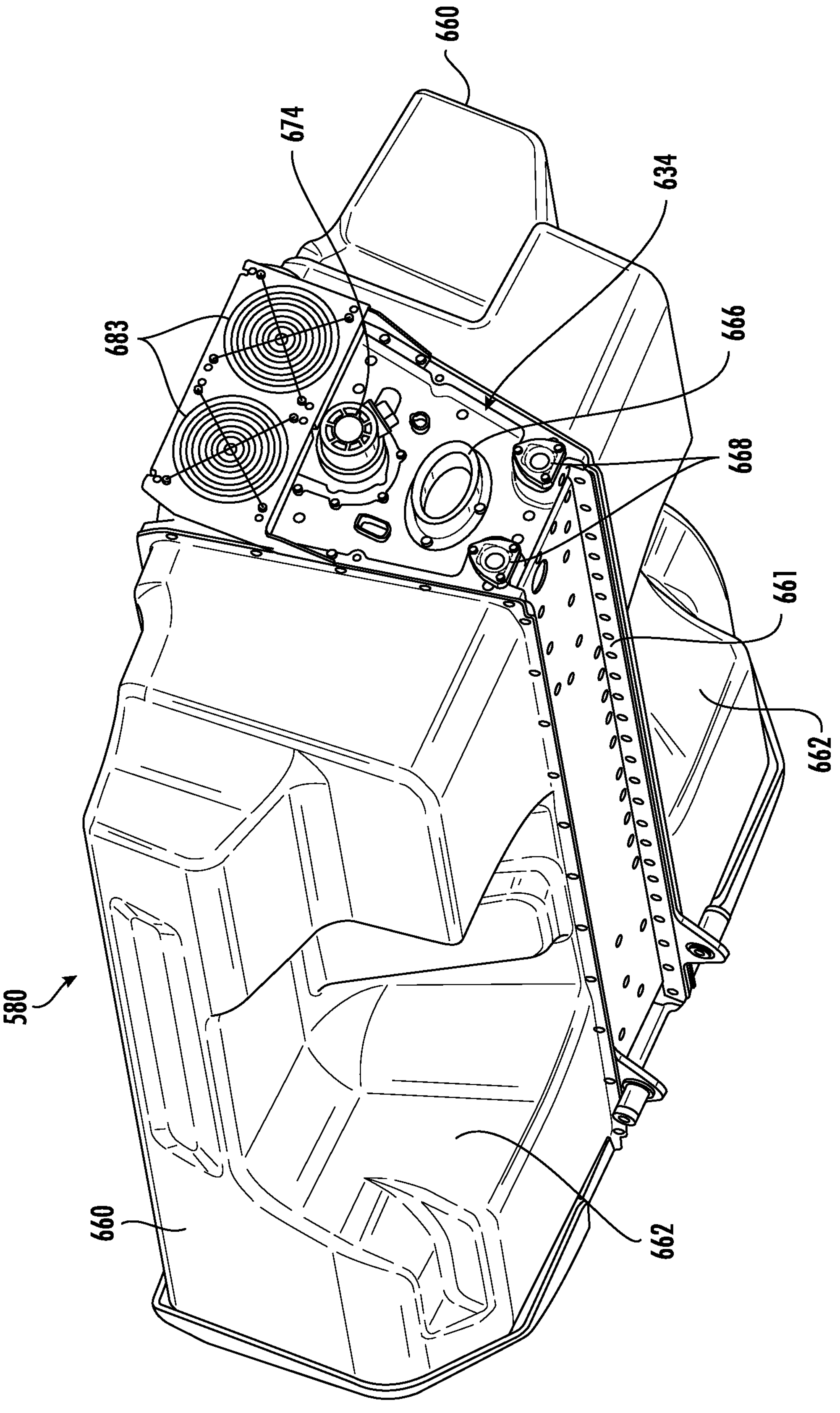
FIG. 17 is a rear perspective view of the example battery of FIG. 16.
Figure 18:
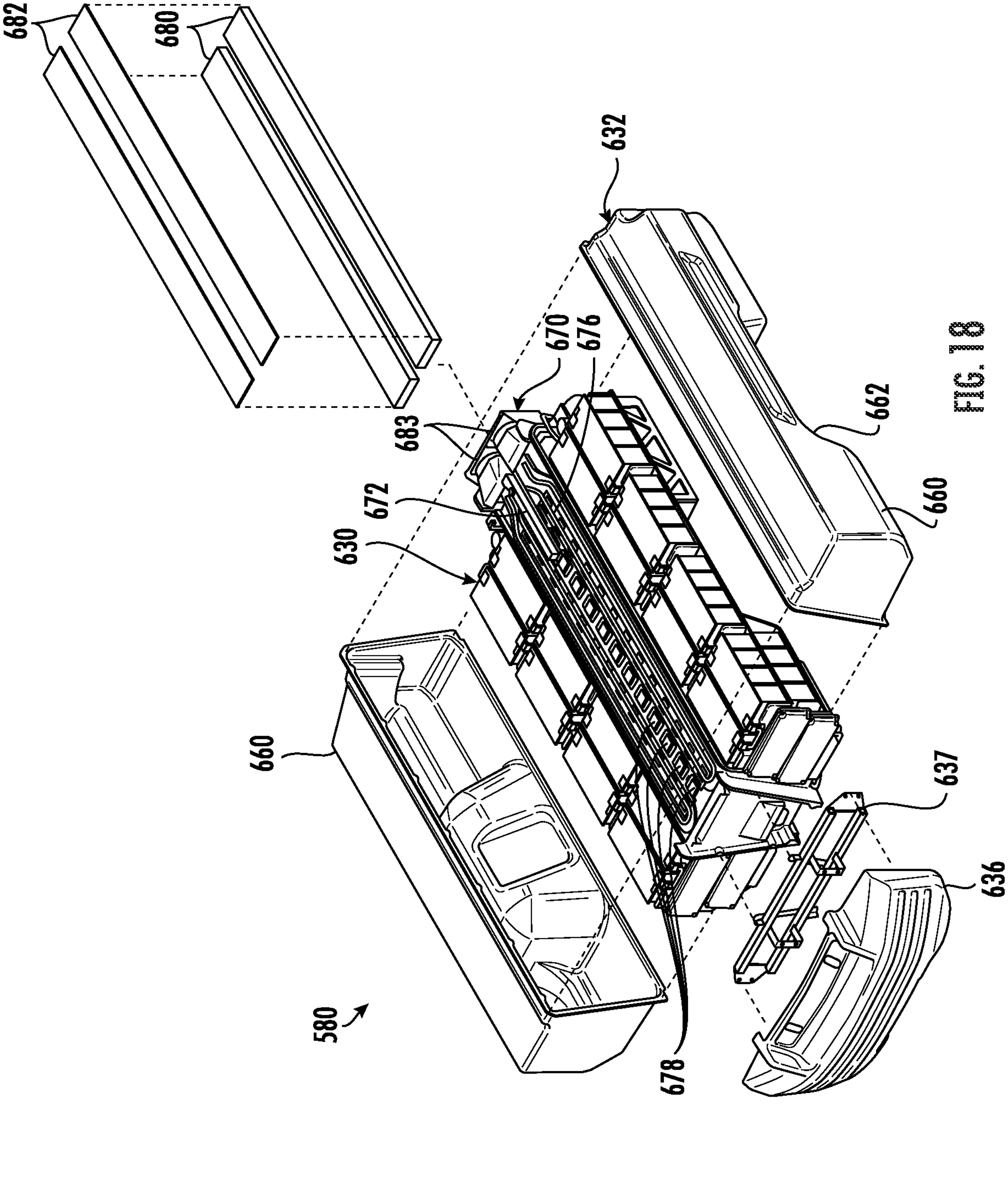
FIG. 18 is an exploded perspective view of the example battery of FIG. 16.
Figure 19:
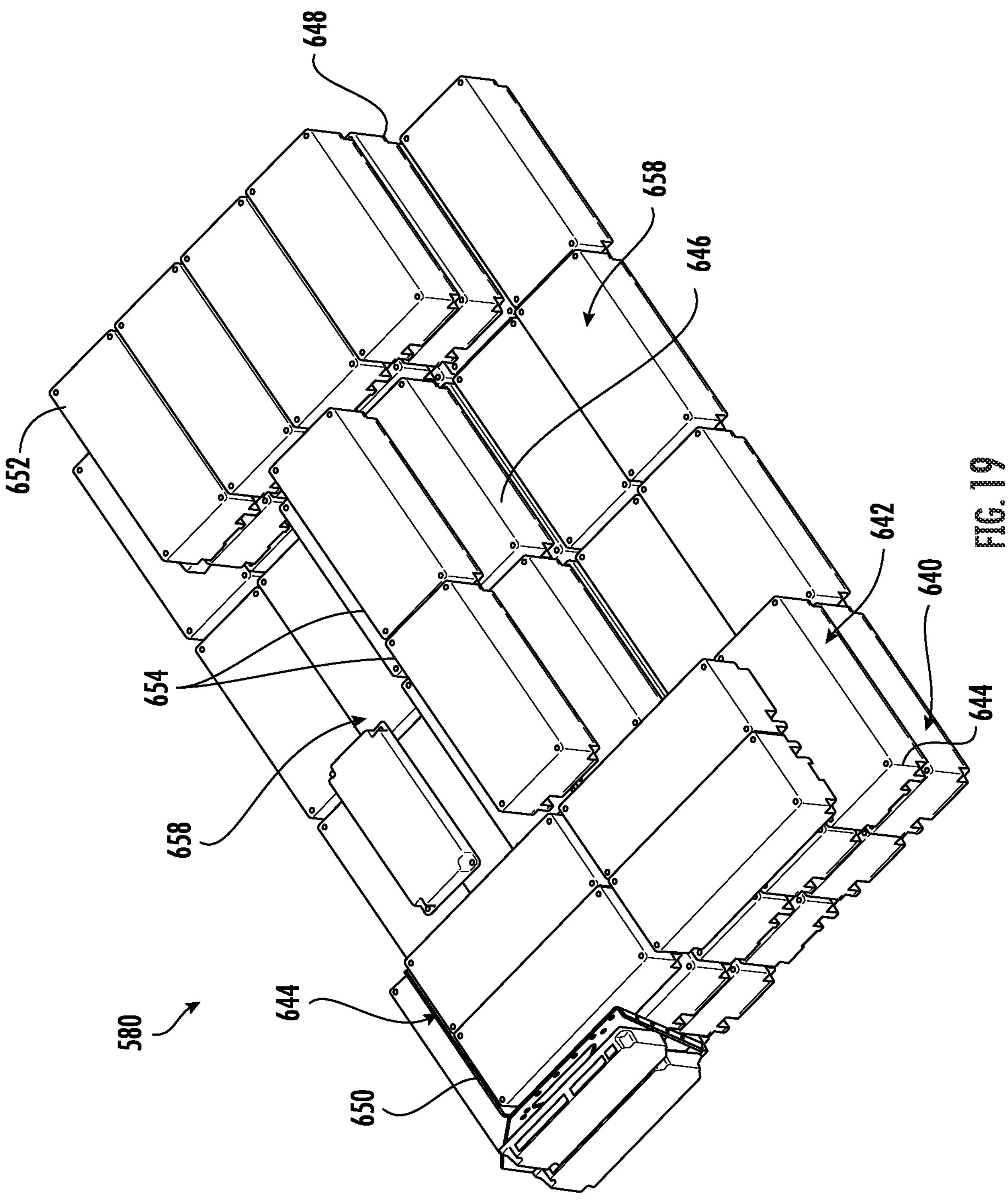
FIG. 19 is a perspective view of an example layout of battery submodules of the example battery of FIG. 16.

FIGS. 16-19 illustrate the example battery 580. FIGS. 16 and 17 are perspective views of battery 580 while FIG. 18 is an exploded perspective view of battery 580. FIG. 19 illustrates an example arrangement of battery submodules. As shown by FIG. 18, battery 580 comprises battery submodules 630, housing 632, connection interface 634 (shown in FIG. 17), and front façade/bumper 636.

Battery submodules 630 comprise a layout of individual charge storing submodules or units arranged in a stack. Each individual unit/submodule 630 is self-contained within an outer housing and is individually removable from the layout of individual battery submodules 630 forming the powerpack of battery 580. The battery submodules 630 may comprise lead acid battery submodules, zinc battery submodules or lithium-ion battery submodules. In other implementations, the battery submodules may comprise other forms of charge storing battery submodules or units. battery submodules 630 are arranged in a stack so as to facilitate horizontal insertion through mouth 624 into cavity 626 and such that the battery submodules directly overlie and directly extend in front of front tires 406 when battery 580 is fully inserted into cavity 626.

FIG. 19 is a bottom perspective view illustrating an example layout of battery submodules 630 of battery 580 which enhances the number of individual battery submodules that may be fit within cavity 626. In the example illustrated, battery 580 comprises a vertical stack of battery submodules, where the vertical stack comprises a first row of battery submodules having a first width and a second row of battery submodules directly underlying the first row and having a second width different than the first width. In the example illustrated, battery 580 comprise rows of battery submodules 630 forming a vertical stack of battery submodules 630, wherein a number of battery submodules in each row or a number of rows forming the vertical stack vary along a longitudinal axis of the battery 580 and of tractor 524.

In the illustrated example, battery 580 comprises an uppermost 6×4 layer 640 of battery submodules 630 with the major dimension of each individual battery submodule 630 extending in a longitudinal direction. Battery 580 comprises a layer 642 of battery submodule 630 comprising a frontward most row 644 of six submodules 630 arranged side-by-side, a 2×2 row 646 of battery submodules 630 arranged side-by-side and centered between sides of layer 640, and a rearward most row 648 of four battery submodules 630 centered between the opposite sides of layer 640. Battery 580 further comprises a third layer 644 of battery submodules 630 comprising a 2×2 frontward most row 650 of battery submodules 630 arranged end-to-end and centered between sides of layer 640, a rearward most row 652 of four battery submodules 630 arranged side-by-side and centered between the sides of layer 640, and an intermediate pair 654 of battery submodules 630 arranged end-to-end, extending between rows 650 and 652, and centered between opposite sides of layer 640.

With the illustrated layout, portions of layer 640 directly overlie front tire 406 while portions of row 644 directly extend in front of front tire 406. Rows 646 and the pair 654 of submodules 630 form an empty space 658 on either side of row 646 and pair 654 to facilitate provision of wheel wells by battery 580. In other implementations, the exact number and layout of individual battery submodules or battery units may vary while still providing an overall arrangement in which the battery submodules extend both over and in front of the front wheels when the battery is fully received within a battery receiving cavity and wherein the battery submodules themselves or the housings adjacent to such battery submodules form at least portions of wheel wells receiving the front tires.

As shown by FIGS. 17 and 18, housing 632 comprises opposite side enclosures 660 and track interface 661 (shown in FIG. 17). Side enclosures 660 extend about and receive battery submodules 630. Side enclosures 660 each have a shape that closely conforms to the above-described layout of battery submodules 630. Each of side enclosures 660 comprises a wheel well 662 which projects into the cavity 658 (shown FIG. 19) of the layout of battery submodules 630. In one implementation, side enclosures 660 may comprise molded polymeric panels.

Track interface 661, shown in FIG. 17, interacts with track 620 (shown in FIG. 15) to guide horizontal movement of battery 580 through mouth 624 and into battery receiving cavity 626. In the example illustrated, track interface 661 comprises an elongate channel sized to receive the rail forming track 620. In other implementations, interface 661 may include rollers or other components to facilitate horizontal movement of battery 580 along track 620. In some implementations, track 620 may comprise an elongate channel which receives at least one projection projecting from a bottom of battery 580 and forming track interface 661.

Connection interface 634, shown in FIG. 17, facilitates connection to a corresponding connection interface 640 of tractor 524 (shown in FIG. 14). Connection interface 634 comprises a blind mate female connector 666 and probe receivers 668. The battery final alignment into the tractor cavity is achieved by guiding the battery probe receivers 668 onto corresponding tractor male pins 669 (shown in FIG. 14). The battery blind mate connector 666 contains electrical pins mating with the corresponding tractor blind mate connector 667 (shown in FIG. 14). The connection enables the functions of high voltage interlock, controller area network (CAN) bus channels communication and main transfer of high voltage and high current direct current (DC) power.

Front façade/bumper 636 is mounted to a front face of the battery submodules 630 by mounting bracket 637. As shown by FIG. 16, bumper 636 remains as part of battery 580 upon removal of battery 580 from tractor 524. Bumper 580 serves to protect both the front of battery 630 as well as the front of tractor 524 when battery 580 is received within tractor 524.

Figure 20A:
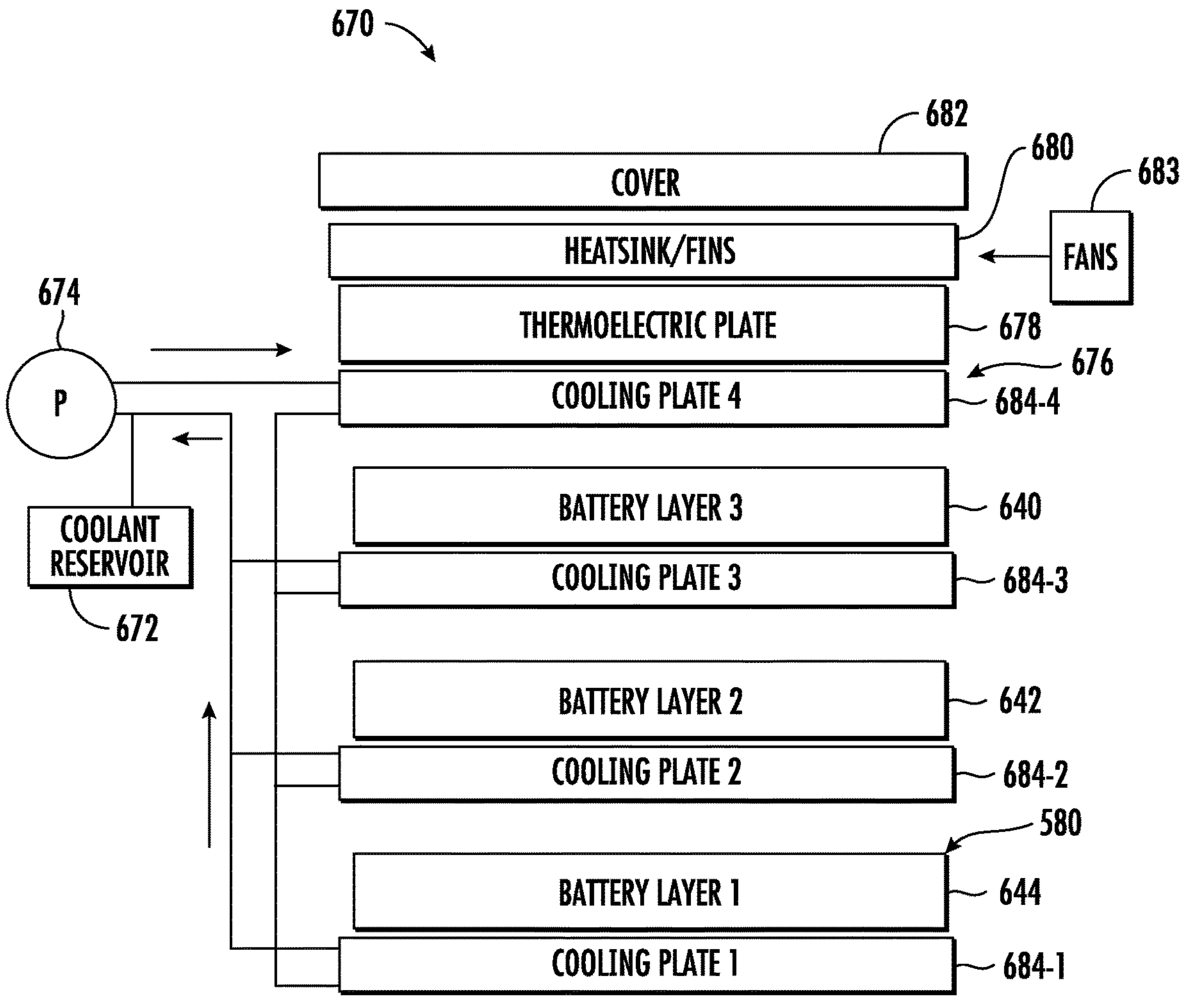
FIG. 20A is a diagram schematically illustrating portions of an example cooling system of the battery of FIG. 16.
Figure 20B:
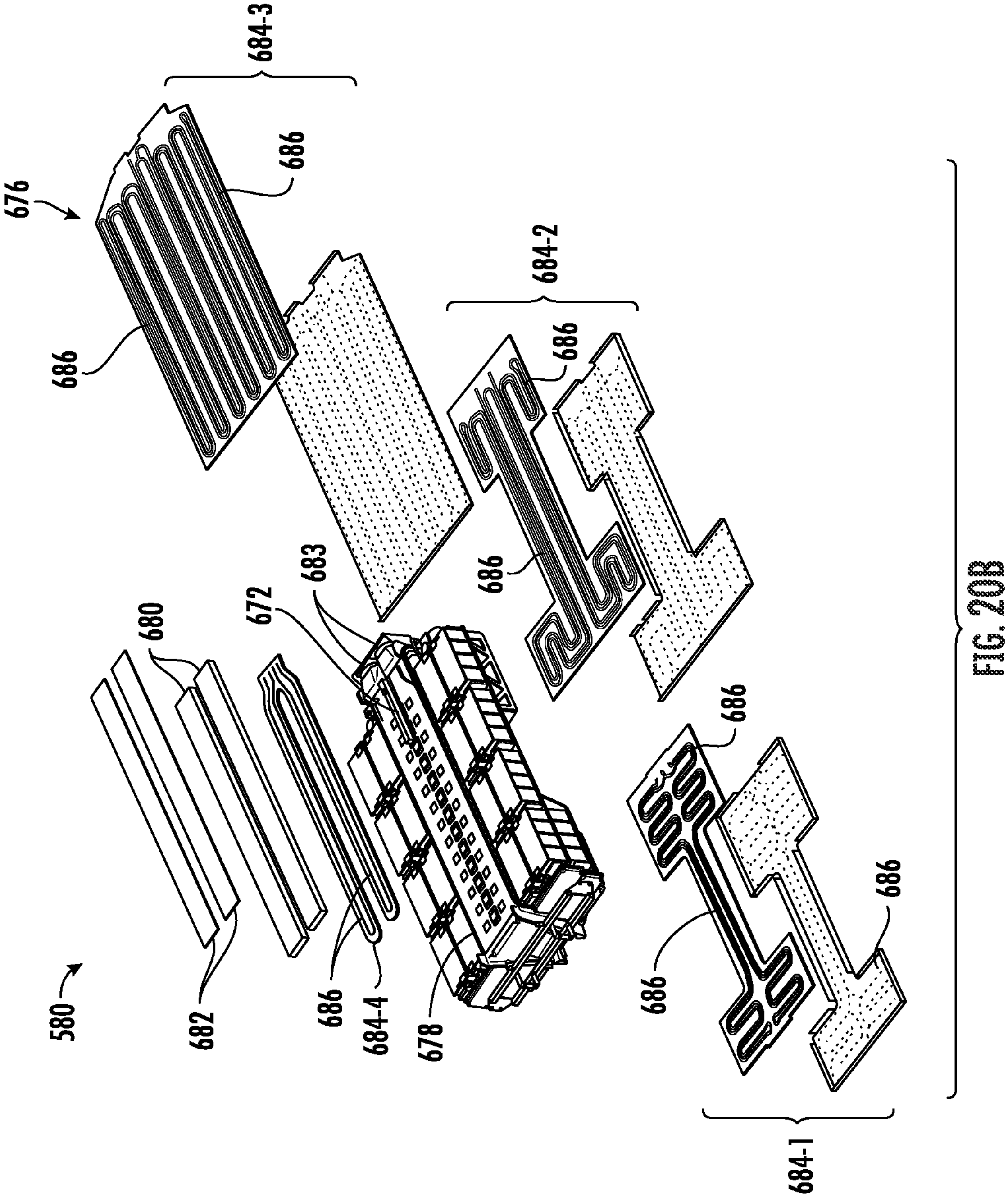
FIG. 20B is an exploded perspective view illustrating portions of the example battery of FIG. 16.
Figure 21:
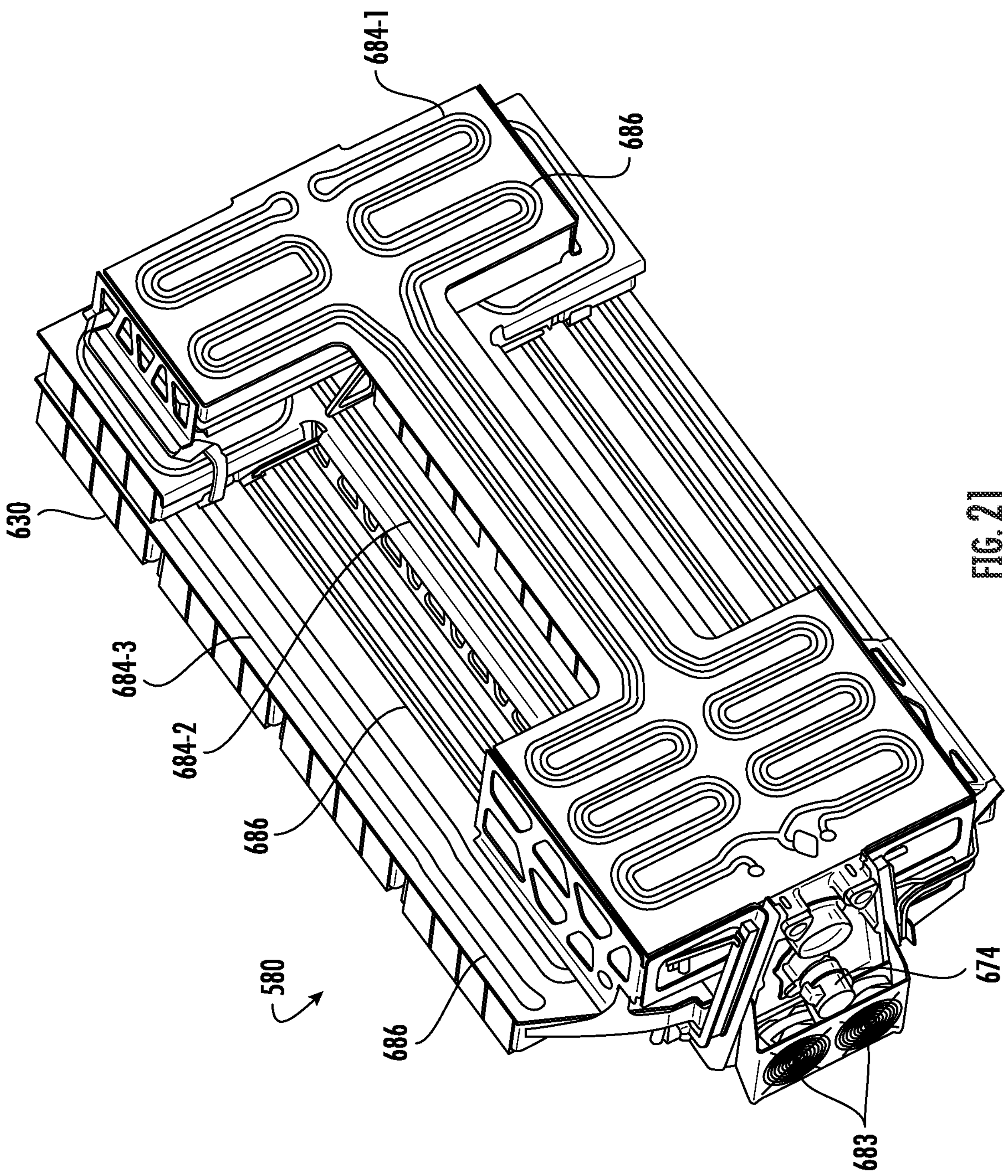
FIG. 21 is a bottom perspective view of portions of the example battery of FIG. 16.
Figure 22:
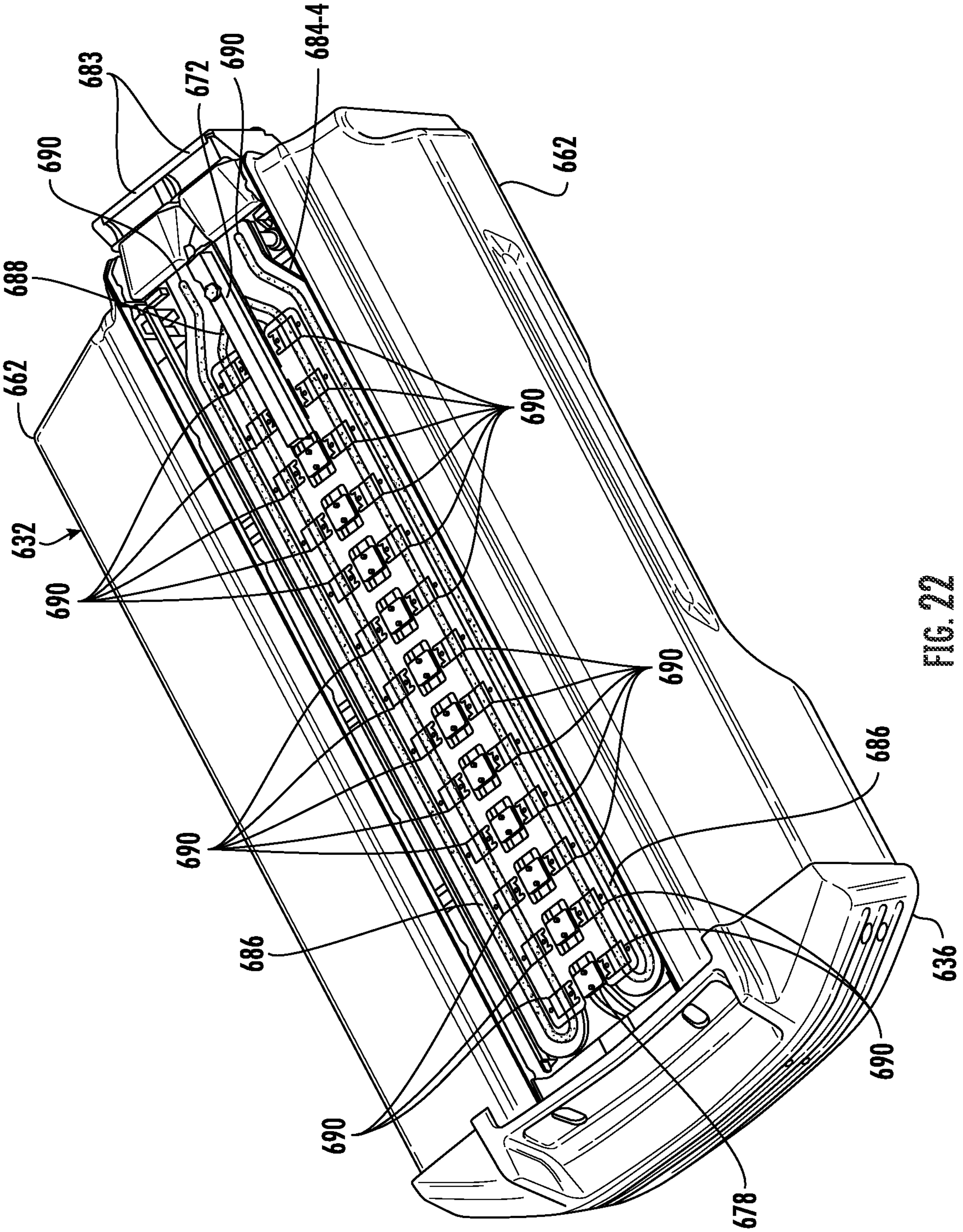
FIG. 22 is a top perspective view illustrating portions of the example battery of FIG. 21.
Figure 23:
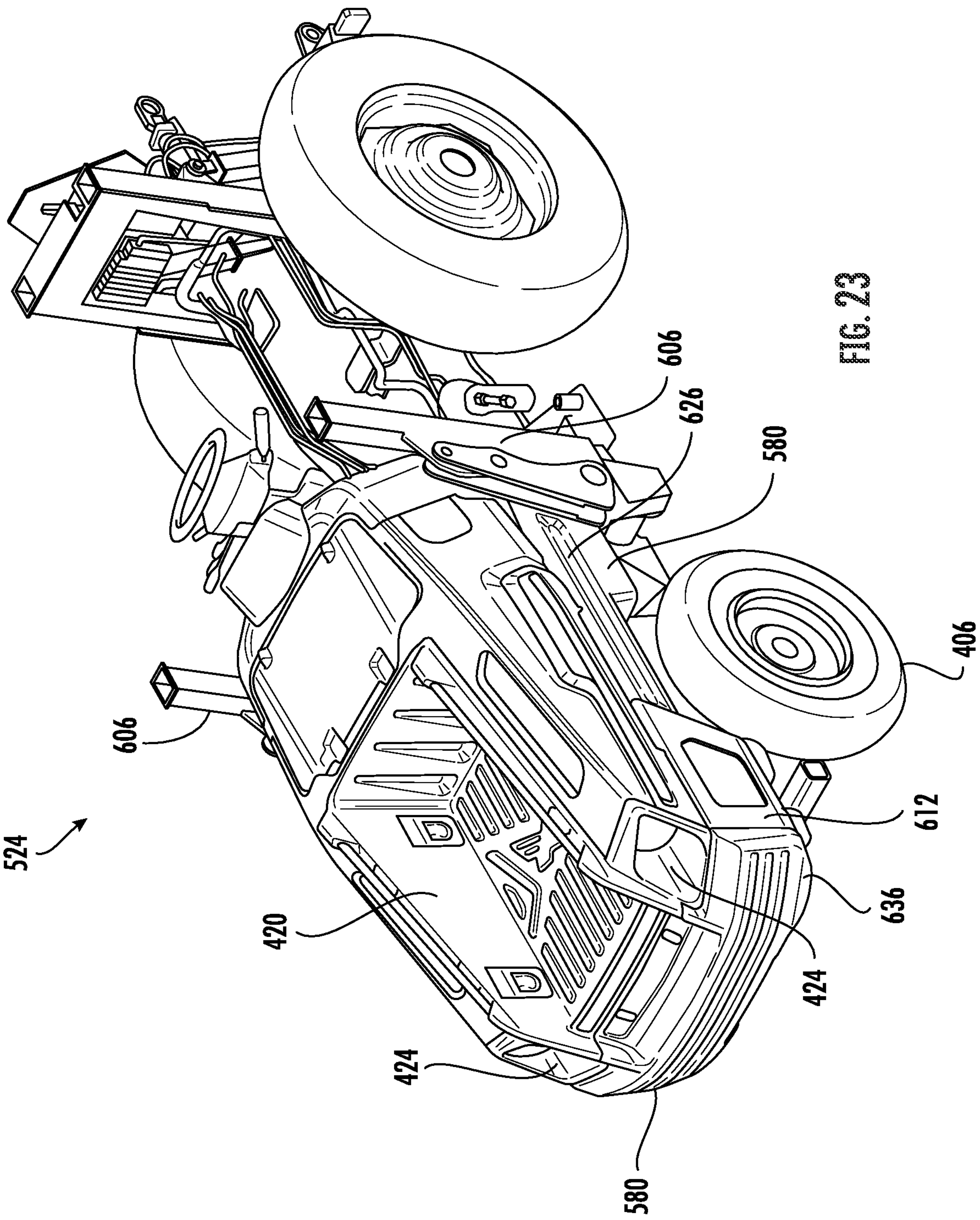
FIG. 23 is a front perspective view of portions of the example tractor of FIG. 14 with the battery of FIG. 16 fully inserted into the example tractor.

As shown by—FIGS. 20-22, in the example illustrated, battery 580 may further comprise an internal self-contained cooling system 670. Cooling system 670 cools battery submodules 630 while battery 580 is in use and while battery 580 is removed from tractor 524, is being transported or is otherwise not being used. As schematically shown in FIG. 20A, cooling system 670 comprises coolant reservoir 672, fluid pump 674, coolant circulation system 676 comprising cooling plates 681-1, 681-2, 684-3 and 684-4 (collectively referred to as cooling plates 684), thermoelectric cooling (TEC) plate 678, heatsink fins 680, heatsink cover 682 and fans 683.

As shown by FIG. 20A, battery layers 640, 642 and 644 are associated and directly coupled to cooling plates 684-3, 684-2 and 684-1, respectively. The topmost battery layers 640 is further thermally coupled to cooling plate 684-4. Each cooling plate 684 circulates a coolant, supplied by coolant reservoir 672, along a face of the cooling plate. Pump 674 pumps the coolant through cooling plate 684-4 and then through cooling plates 684-3, 684-2 and 684-1 where the coolant absorbs heat from the battery layers 640, 642 and 644. The heated coolant is directed back to pump 674, wherein pump 674 then once again pumps the heated fluid through and across cooling plate 684-4. Thermoelectric plate 678 absorbs heat from the heated coolant flowing through coolant plate 684-4 and transfers the heat to heatsink/fin 680. Fans 683 direct a cooler airflow through and across heatsink/fins 680, below cover 682, to extract heat from the heatsink/fin 680, wherein the heated air is subsequently discharged. An example is illustrated, where each of the components of cooling system 670 is self-contained as a single unit along with the various layers of battery 580.

FIGS. 20B, 21 and 22 illustrate a particular example of cooling system 670. Reservoir 672 stores a supply of coolant for circulation through coolant circulation system 676 by fluid pump 674. Fluid pump 674 receives electrical power from the battery submodules 630 and pumps fluid through coolant circulation system 676. In some implementations, the coolant may comprise glycerol. In other implementations, the coolant may comprise other coolant fluids.

Coolant circulation system 676 comprises fluid circulation conduits that extend along and adjacent to battery submodules 630 and TEC plate 678. Such conduits may be formed from a material, such as aluminum, copper, or the like, that thermally conduct heat to the coolant (such as glycerol) circulating within such conduits. FIGS. 20B-22 illustrate the example coolant circulation system 676. As shown by FIG. 20B, coolant circulation system 676 comprises four cooling plates 684-1, 684-2, 684-3 and 684-4.

Each of cooling plates 684 comprises a pair of panels which are joined, and which cooperate to form fluid circulation conduits 686. The conduit 686 travel along serpentine paths across substantially in entirety of the surface area of the individual cooling plate 684. Each serpentine path of conduit 686 has an inlet and an outlet.

As shown by FIGS. 20B and 21, cooling plate 684-1 has an I-shape with a single supply and return fluid path extending between the widened multiple serpentine ends of the conduit 686. As shown by FIG. 21, the layout of conduit 686 of cooling plate 684 has a shape that matches the layout of the lowermost layer of battery submodules 630 such that conduit 686 of cooling plate 684-1 extends offs to each of the battery submodules 630 of the lowermost layer.

Like cooling plate 684-1, cooling plate 684-2 has a conduit 686 having a layout that matches or corresponds to the layout of the overlying layer of battery submodules 630. In the example illustrated, conduit 686 of cooling plate 684-2 comprises two pairs of supply and return fluid paths extending between the widened multiple serpentine ends of conduit 686 so as to cool the additional battery submodules 630 in the middle layer of module 630.

Cooling plate 684-3 is located beneath the topmost layer of battery submodules 630. Cooling plate 684-3 has fluid conduit 686 having a layout of six serpentine loops corresponding to the six battery submodules 630 that form the width of the topmost layer of battery submodules 630 of battery 580. As a result, each of the layers of battery submodules 630 of battery 580 is adjacent to a portion of a fluid conduit 686 carrying coolant.

Cooling plate 684-4 extends below TEC plate 678 and has a shape corresponding to TEC plate 678. As shown by FIG. 22, cooling plate 684-4 has a fluid conduit arranging a pair of loops, wherein coolant (shown with stippling) is pumped in at inlets 688 and discharged at outlets 690. Conduit 686 of cooling plate 684-4 circulate fluid across thermoelectric modules of TEC plate 678. In some implementations, the conduit of each of the cooling plate 684 are fluidically connected such that a larger circulation path is established such that the coolant circulating across each layer of battery submodules 630, at some time, is circulated across the thermoelectric modules of TEC plate 678. In other implementations, the fluid conduit 686 of the different cooling plate 684 may be independent of one another, being independently pumped by fluid pump 674.

TEC plate 678 comprises a panel overlying cooling plate 684-4 and sandwiched between cooling plate 684-4 and heatsink fins 680. TEC plate 678 comprises a series of individual TEC modules 690. Each of modules 690 comprises a heat pump or Peltier device having a cool side thermally coupled to a portion of the fluid conduit 686 of cooling plate 684-4 and a hot side thermally coupled to heatsink fins 680. TEC modules 690 transfer heat from the conduit 686 of cooling plate 684-4 to heatsink fins 680.

Heatsink covers 682 comprise panels that extend over heatsink fins 682 constraining airflow, provided by fans 683, along the sides of heatsink fins 680. Fans 683 draw air through corresponding vents 692 of tractor 524 (shown in FIG. 14). In the example illustrated, vents 692 are pneumatically connected to the interior floor of cab 408. In some implementations, the air may be drawn through or forced through a filter prior to being directed along heat sink fins 680. After passing longitudinally across battery 580 and absorbing heat from heatsink fins 680, the air may be discharged through openings within battery 580. In the example illustrated, the heated air is discharged at a front end of battery 580 between battery submodules 630 and a lower end of bumper 636.

In other implementations, the number of cooling plates and their respective shapes and conduits 686 may be differently configured depending upon the layout of each of the associated individual layers of battery submodules 630. In some implementations, the coolant circulated through each of the cooling plates 684 may be supplied by a pump associated with tractor 524, rather than carried by battery 580. In some implementations, battery 580 may omit cooling system 670.

Figure 24:
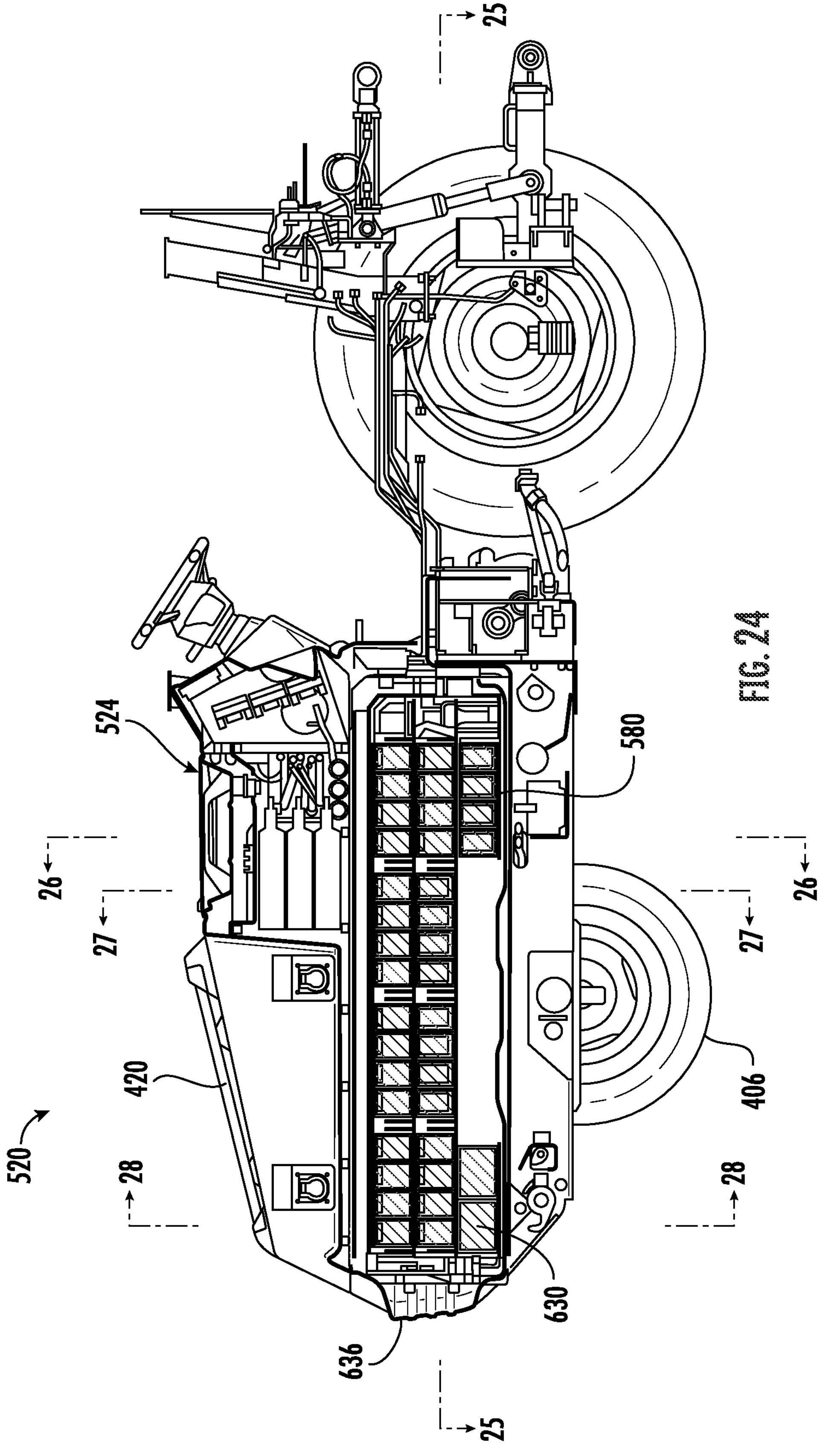
FIG. 24 is a sectional view of the tractor of FIG. 23 along a longitudinal centerline of the tractor.
Figure 25:
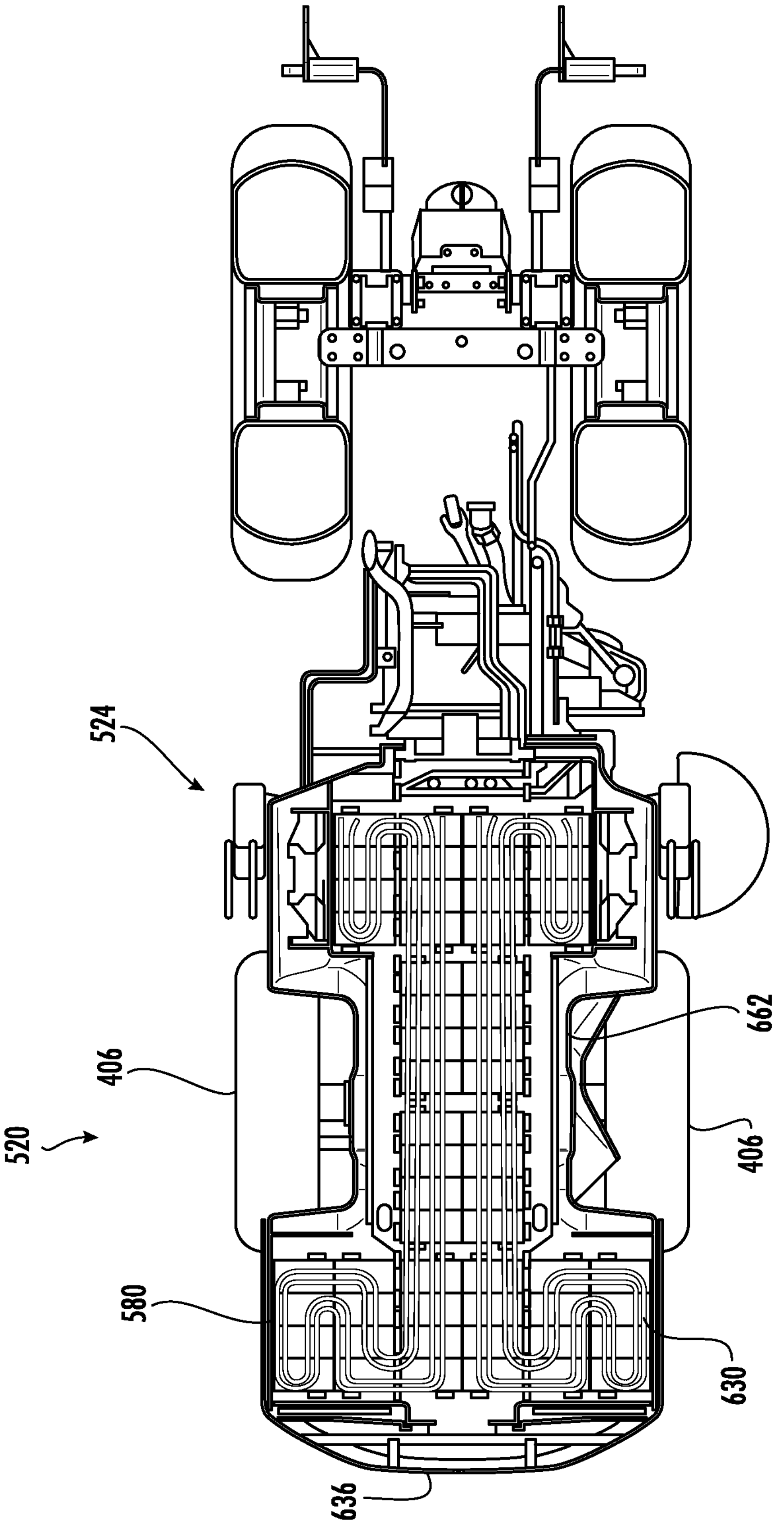
FIG. 25 is a sectional view of the tractor of FIG. 24 taken along line 25-25.
Figure 26:
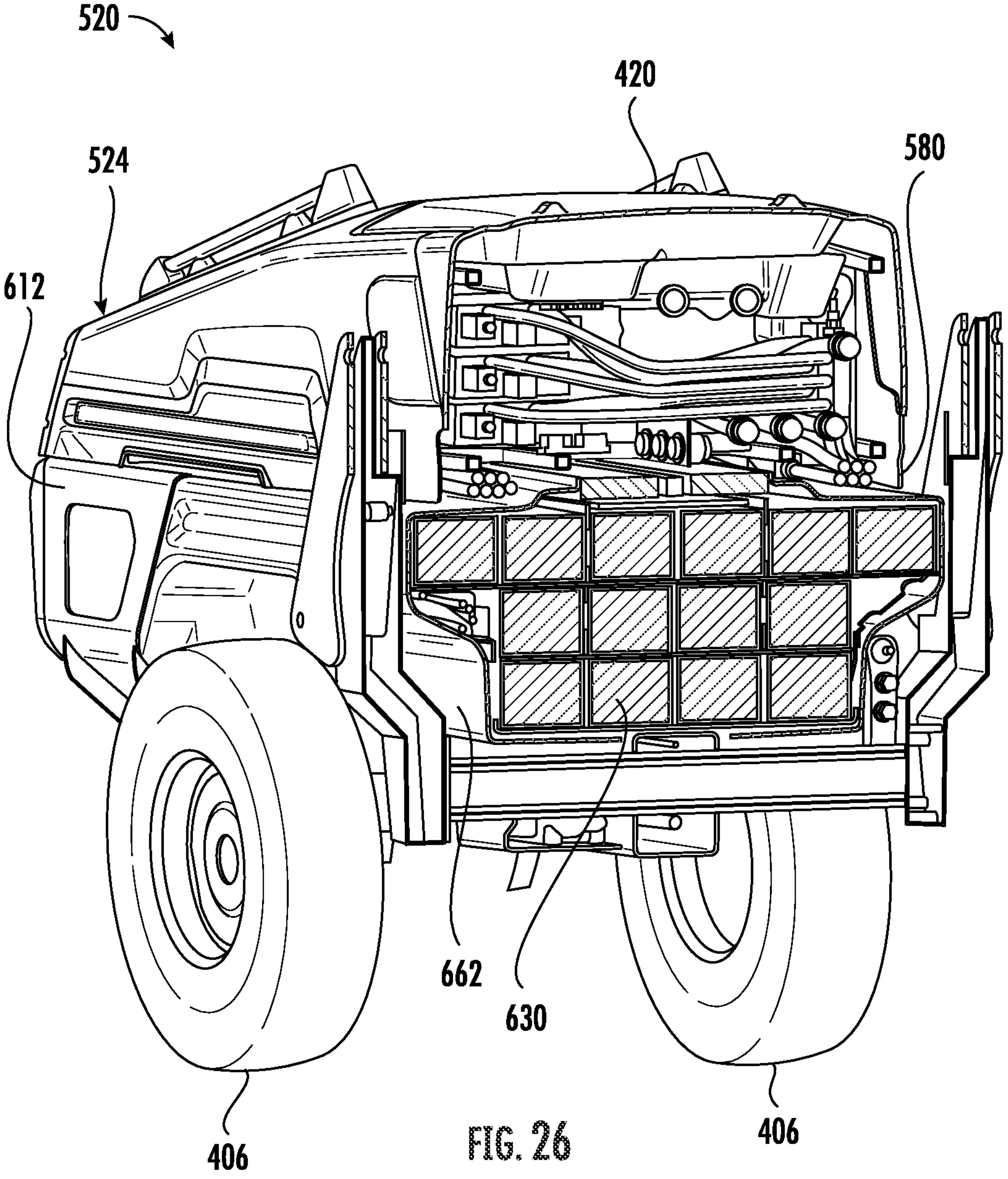
FIG. 26 is a section of the tractor of FIG. 24 taken along line 25-25.
Figure 27:
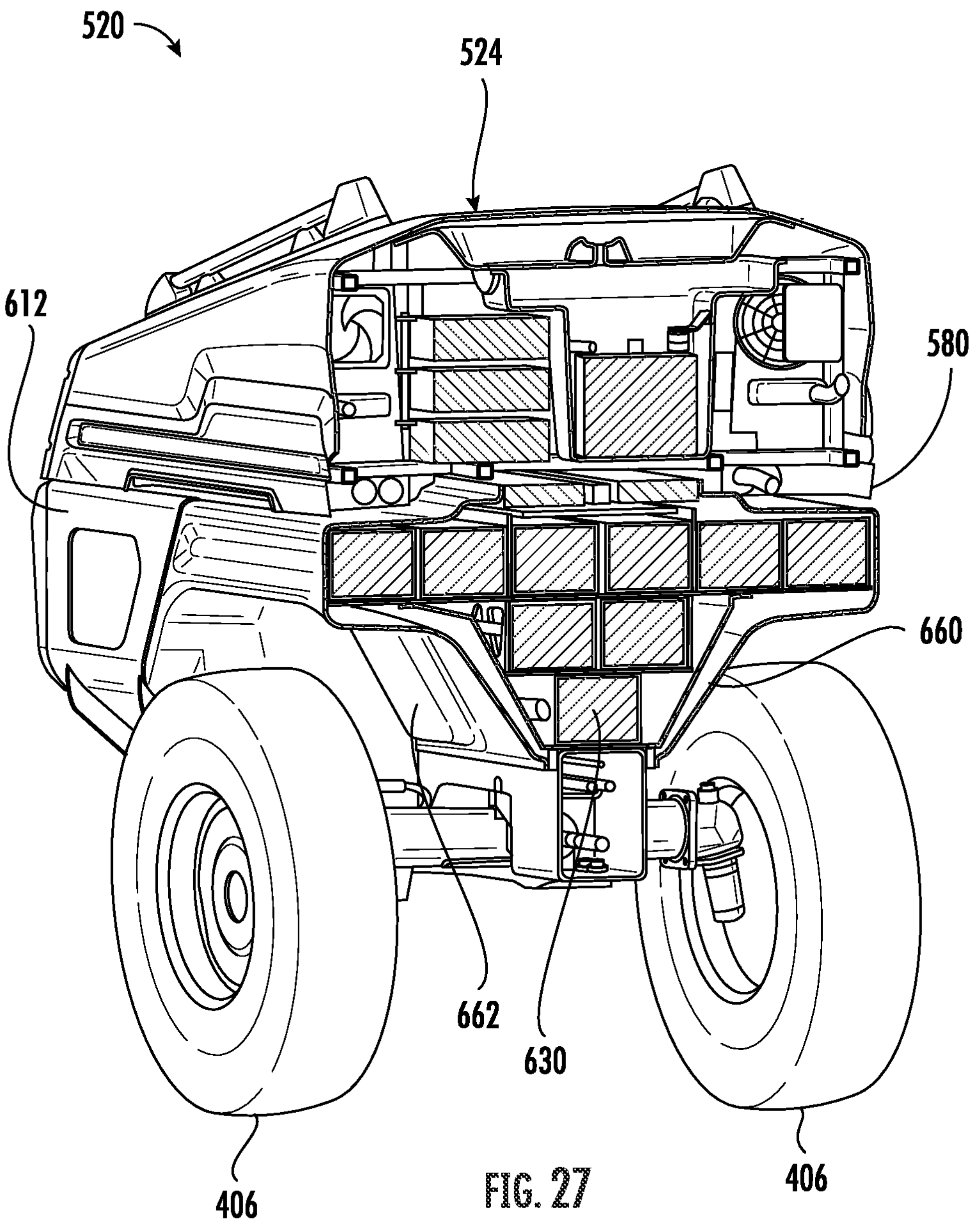
FIG. 27 is a sectional view of the tractor of FIG. 24 taken along line 27-27.
Figure 28:
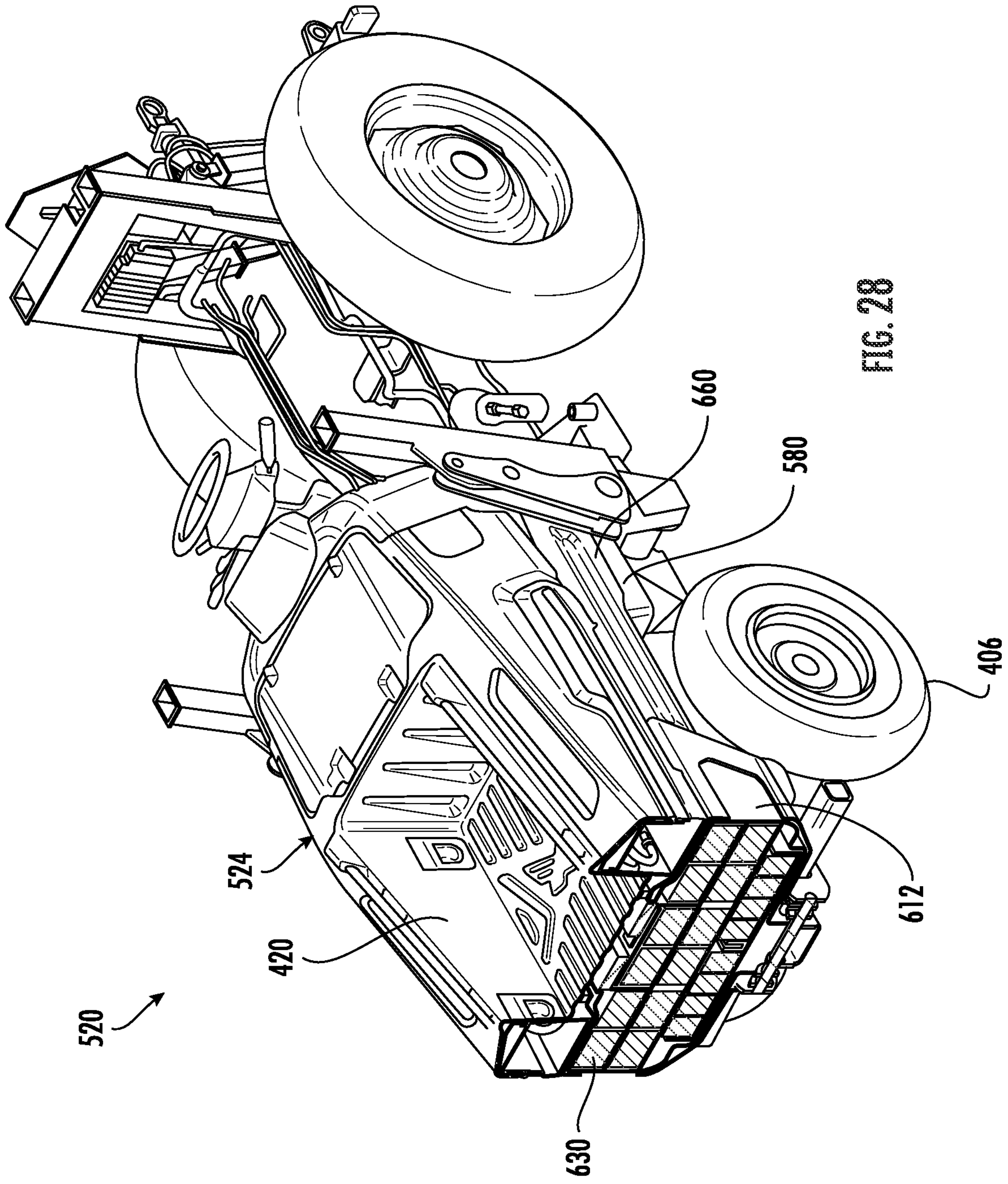
FIG. 28 is a sectional view of the tractor of FIG. 24 taken along line 28-28.

FIGS. 23-28 illustrate battery 580 fully inserted into battery receiving cavity 626 of tractor 524 (portions of which are shown). FIG. 24 of tractor 524 and battery 580 taken along a longitudinal centerline of tractor 524. FIG. 25 is a sectional view of tractor 524 taken along line 25-25 of FIG. 23. FIG. 26 is a sectional view of tractor 524 taken along line 26-26 of FIG. 24. FIG. 27 is a sectional view of tractor 524 taken along line 27-27 of FIG. 24. FIG. 28 is a sectional view of tractor 524 taken along line 28-28 of FIG. 24. As shown by FIGS. 23-28, battery 586 and its submodules 630 wrap about the front of tires 406. Battery 586 and its submodules 630 extend directly over front wheels 406 and also extend directly in front of the front wheels 406. Battery 580 and its submodules form a portion of such wheel wells 662, forming an interior surface of the wheel wells 662. Battery submodules 630 of battery 580 are located both rearwardly and forwardly of the front wheels 406.

Although the claims of the present disclosure are generally directed to battery swap systems, the present disclosure is additionally directed to the features set forth in the following definitions.

1. A battery swap system comprising:
   - a battery transport comprising:
     - a support frame;
     - a connector coupled to the support frame and configured to connect to a powered vehicle for moving the battery transport;
     - a battery carriage movably coupled to the support frame and configured to carry a battery from a transport supported position to a tractor received position.
2. The battery swap system of definition 1, wherein the battery transport comprises wheels or tracks coupled to the support frame for rotation about an axis.
3. The battery swap system of definition 2, wherein the battery carriage is movable to carry battery along a second axis parallel to the axis.
4. The battery swap system of definition 3 further comprising a battery connector carried by the battery carriage to releasably connect to the battery.
5. The battery swap system of definition 4, wherein the battery connector comprises a hook pivotable between a battery engaged position and a battery released position.
6. The battery swap system of definition 3 further comprising a manual crank operably coupled to the battery carriage to controllably move and position the battery carriage along the second axis.
7. The battery swap system of definition 6 further comprising a worm gear operably coupled to the manual crank for rotation by the manual crank and a worm gear follower in engagement with the worm gear and connected to the battery carriage.
8. The battery swap system of definition 3 further comprising a powered carriage drive operably coupled to the battery carriage to controllably move and position the battery carriage along the second axis.

9. The battery swap system of definition 8, wherein the powered carriage drive comprises a drive source carried by the support frame and selected from a group of drive sources consisting of: an electric motor and a hydraulic motor.

10. The battery swap system of definition 9 further comprising an electric battery bay supported by the support frame to electrically connect a received battery to the powered carriage drive.

11. The battery swap system of definition 9, wherein the powered carriage drive comprises a carriage drive connection interface connected to the drive source and to releasably connect to a power source interface remote from the battery transport.

12. The battery swap system of definition 1 further comprising a second battery carriage movably coupled to the support frame and configured to carry a second battery from a transport supported position to a tractor received position.

13. The battery swap system of definition 12, wherein the battery transport comprises wheels coupled to the support frame for rotation about an axis.

14. The battery swap system of definition 12, wherein the battery carriage is movable to carry the battery along a second axis parallel to the axis and wherein the second battery carriage is movable to carry the second battery along a third axis parallel to the axis.

15. The battery swap system of definition 14 further comprising:
 a battery connector carried by the battery carriage to releasably connect to the battery; and
 a second battery connector carried by the second battery carriage to releasably connect to the second battery.

16. The battery swap system of definition 15, wherein the battery connector comprises a hook pivotable between a battery engaged position and a battery released position.

17. The battery swap system of definition 14 further comprising:
 a first manual crank operably coupled to the battery carriage to controllably move and position the battery carriage along the second axis; and
 a second manual crank operably coupled to the battery carriage to controllably move and position the second battery carriage along the third axis.

18. The battery swap system of definition 17 further comprising a worm gear operably coupled to the manual crank for rotation by the manual crank and a worm gear follower in engagement with the worm gear and connected to the battery carriage.

19. The battery swap system of definition 14 further comprising a powered carriage drive operably coupled to the battery carriage to controllably move and position the battery carriage along the second axis.

20. The battery swap system of definition 1, wherein the battery carriage is movably coupled to the support frame for movement along a first axis and wherein the battery transport further comprises a locating carriage carrying and movably supporting the battery carriage for locating the battery carriage along a second axis perpendicular to the first axis.

21. The battery swap system of definition 11, wherein the battery transport comprises wheels coupled to the support frame for rotation about an axis.

22. The battery swap system of definition 21, wherein the battery carriage is movable to carry the battery along a second axis parallel to the axis.

23. The battery swap system of definition 22 further comprising a battery connector carried by the battery carriage to releasably connect to the battery.

24. The battery swap system of definition 23, wherein the battery connector comprises a hook pivotable between a battery engaged position and a battery released position.

25. The battery swap system of definition 22 further comprising a manual crank operably coupled to the battery carriage to controllably move and position the battery carriage along the second axis.

26. The battery swap system of definition 25 further comprising a worm gear operably coupled to the manual crank for rotation by the manual crank and a worm gear follower in engagement with the worm gear and connected to the battery carriage.

27. The battery swap system of definition 22 further comprising a powered carriage drive operably coupled to the battery carriage to controllably move and position the battery carriage along the second axis.

28. The battery swap system of definition 27, wherein the powered carriage drive comprises a drive source carried by the support frame and selected from a group of drive sources consisting of: an electric motor and a hydraulic motor.

29. The battery swap system of definition 28 further comprising an electric battery bay supported by the support frame to electrically connect a received battery to the powered carriage drive.

30. The battery swap system of definition 28, wherein the powered carriage drive comprises a carriage drive connection interface connected to the drive source and to releasably connect to a power source interface remote from the battery transport.

31. The battery swap system of definition 20 comprising a manual crank operably coupled to the locating carriage to controllably move and position the locating carriage along the second axis.

32. The battery swap system of definition 31 further comprising a worm gear operably coupled to the manual crank for rotation by the manual crank and a worm gear follower in engagement with the worm gear and connected to the locating carriage.

33. The battery swap system of definition 20 further comprising a powered locating carriage drive operably coupled to the locating carriage to controllably move and position the locating carriage along the second axis.

34. The battery swap system of definition 33, wherein the powered locating carriage drive comprises a locating drive source carried by the support frame and selected from a group of drive sources consisting of: an electric motor and a hydraulic motor.

35. The battery swap system of definition 34 further comprising an electric battery bay supported by the support frame to electrically connect a received battery to the powered locating carriage drive.

36. The battery swap system of definition 28, wherein the powered locating carriage drive comprises a locating carriage drive connection interface connected to the locating drive source and to releasably connect to a power source interface remote from the battery transport.

37. The battery swap system of definition 20 further comprising a second battery carriage carried by the locating carriage for movement along a third axis perpendicular to the first axis.
38. The battery swap system of definition 20 further comprising:
   a second locating carriage for movement along the second axis; and
   a second battery carriage carried by the second locating carriage for movement along a third axis perpendicular to the first axis.
39. The battery swap system of definition 1 further comprising a battery charging system supported by the support frame, the battery charging system comprising a battery connection interface for releasable connection to the battery while the battery is supported by the battery carriage.
40. The battery swap system of definition 39, wherein the battery connection interface is movable relative to the support frame between a battery connected position and a withdrawn position.
41. The battery swap system of definition 39 further comprising a charging battery bay to receive a charging battery and connect the charging battery within the charging battery bay to the battery charging system.
42. The battery swap system of definition 1 further comprising:
   wheels coupled to the support frame and movably supporting the support frame; and
   an electric motor supported by the support frame and operably coupled to the wheels to rotatably drive the wheels.
43. The battery swap system of definition 1, wherein the connector comprises a drawbar extending from the support frame.
44. The battery swap system of definition 1, wherein the connector comprises a three-point hitch extending from the support frame.
45. The battery swap system of definition 1 further comprising a top deck supported by the support frame above the battery carriage and spaced from the battery carriage by height greater than a height of the battery to be carried by the battery carriage.
46. The battery swap system of definition 1 further comprising a scale supported by the support frame.
47. The battery swap system of definition 1 further comprising an actuatable carriage suspension system supported by the support frame to adjust at least one of roll, pitch, and height of the battery carriage relative to the support frame.
48. The battery swap system of definition 47, wherein the actuatable carriage suspension system comprises a plurality of independently actuatable airbags between the support frame in the battery carriage.
49. The battery swap system of definition 48, wherein the actuatable carriage suspension system further comprises a leaf spring linkage.
50. The battery swap system of definition 47, wherein the actuatable carriage suspension system comprises leveling screw jacks.
51. The battery swap system of definition 1 further comprising:
   a camera supported by the support frame; and
   a powered actuator operably coupled to the battery carriage; and
   a controller to output control signals to controllably actuate the powered actuator to move the battery carriage based upon signals from the camera.
52. The battery swap system of definition 51 further comprising:
   a locating carriage to locate the battery carriage; and
   locating powered actuator operably coupled to the locating carriage, wherein the controller is to output control signals to controllably actuate the locating powered actuator to move the locating carriage based upon signals from the camera.
53. The battery swap system of definition 51 further comprising:
   an actuatable carriage suspension system supported by the support frame to adjust at least one of roll, pitch, and height of the battery carriage relative to the support frame; and
   a suspension powered actuator operably coupled to the actuatable carriage suspension, wherein the controller is to output control signals to controllably actuate the suspension powered actuator to adjust at least one of the role, the pitch and the height of the battery carriage relative to the support frame.
54. The battery swap system of definition 1 further comprising:
   a tractor serving as a powered vehicle, the tractor having a front chassis with a battery receiving cavity extending rearwardly from a front end of the front chassis.
55. The battery swap system of definition 54, wherein the tractor comprises front wheels extending from opposite sides of the front chassis and headlights along the front of the front chassis, the battery receiving cavity located vertically between front wheels of the tractor and the headlights.
56. The battery swap system of definition 54 further comprising:
   a sensor supported by the tractor at a position to sense relative positioning of the battery supported by the battery carriage relative to the battery receiving cavity; and
   a controller receives signals from the sensor into output alignment signals based upon a degree of alignment between the battery supported by the battery carriage and the battery receiving cavity.
57. The battery swap system of definition 56 further comprising a user indicator to output an indication of the degree of alignment to a person in control of positioning of the battery carriage, the indication comprising at least one of a visible indication and an audible indication.
58. The battery swap system of definition 56 further comprising a powered carriage drive operably coupled to the battery carriage, wherein the powered carriage drive is to automatically move the battery carriage and the battery based upon the alignment signals.
59. The battery swap system of definition 1 further comprising a cellular modem supported by the support frame to output communication signals indicating a level of charge of a battery supported by the battery carriage.
60. The battery swap system of definition 1 further comprising a global positioning system receiver supported by the support frame to output global positioning system signals indicating a geolocation of the battery transport.

61. The battery swap system of definition 1 further comprising the battery.
62. The battery swap system of definition 61, wherein the battery comprises a battery connection interface to releasably connect the battery to the battery carriage for movement of the battery in unison with the battery carriage.
63. The battery swap system of definition 62, wherein the battery carriage comprises a hook and wherein the battery connection interface comprises a shaft movably received within the hook.
64. The battery swap system of definition 63 further comprising a powered actuator supported by the support frame to controllably pivot the hook between a shaft receiving position and a shaft withdrawn position.
65. The battery swap system of definition 64, wherein the powered actuator comprises an electric solenoid.
66. The battery swap system of definition 64 further comprising a lever for manually pivoting the hook between a shaft receiving position and a shaft withdrawn position.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A battery swap system comprising:
- a tractor comprising:
  - rear wheels configured to propel the tractor in a forward direction, the rear wheels being rotatable about a first axis;
  - front wheels forward the rear wheels and rotatable about a second axis;
  - a front chassis between the front wheels; and
  - a battery receiving cavity horizontally and rearwardly extending into the front chassis between the front wheels and having a front opening facing in a forward direction perpendicular to the first axis;
- a battery transport comprising:
  - a support frame;
  - a connector coupled to the support frame and configured to connect to a powered vehicle for moving the battery transport;
  - a battery carriage movably coupled to the support frame and configured to horizontally carry a battery from a transport supported position, horizontally through the front opening and into the battery receiving cavity.

2. The battery swap system of claim 1, wherein the battery transport comprises wheels or tracks coupled to the support frame for rotation about a first transport axis, wherein the battery carriage is movable to carry battery along a second transport axis parallel to the axis.

3. The battery swap system of claim 2 further comprising a battery connector carried by the battery carriage to releasably connect to the battery.

4. The battery swap system of claim 3, wherein the battery connector comprises a hook pivotable between a battery engaged position and a battery released position.

5. A battery swap system comprising:
- a battery transport comprising:
  - a support frame;
  - a connector coupled to the support frame and configured to connect to a powered vehicle for moving the battery transport;
  - a battery carriage movably coupled to the support frame and configured to horizontally carry a battery from a transport supported position to a tractor received position;
  - wheels or tracks coupled to the support frame for rotation about an axis, wherein the battery carriage is movable to carry battery along a second axis parallel to the axis; and
  - a manual crank operably coupled to the battery carriage to controllably move and position the battery carriage along the second axis.

6. The battery swap system of claim 5 further comprising a worm gear operably coupled to the manual crank for rotation by the manual crank and a worm gear follower in engagement with the worm gear and connected to the battery carriage.

7. The battery swap system of claim 2 further comprising a powered carriage drive operably coupled to the battery carriage to controllably move and position the battery carriage along the second transport axis.

8. The battery swap system of claim 1 further comprising a second battery carriage movably coupled to the support frame and configured to carry a second battery from a transport supported position to a tractor received position.

9. The battery swap system of claim 8, wherein the battery transport comprises wheels or tracks coupled to the support frame for rotation about a first transport axis, wherein the battery carriage is movable to carry the battery along a second transport axis parallel to the first transport axis and wherein the second battery carriage is movable to carry the second battery along a third transport axis parallel to the first transport axis.

10. The battery swap system of claim 9 further comprising:
- a battery connector carried by the battery carriage to releasably connect to the battery; and
- a second battery connector carried by the second battery carriage to releasably connect to the second battery.

11. The battery swap system of claim 10, wherein the battery connector comprises a hook pivotable between a battery engaged position and a battery released position.

12. The battery swap system of claim 9 further comprising:
- a first manual crank operably coupled to the battery carriage to controllably move and position the battery carriage along the second transport axis; and
- a second manual crank operably coupled to the battery carriage to controllably move and position the second battery carriage along the third transport axis.

13. The battery swap system of claim 9 further comprising a powered carriage drive operably coupled to the battery carriage to controllably move and position the battery carriage along the second transport axis.

14. The battery swap system of claim 1, wherein the battery carriage is movably coupled to the support frame for movement along a first transport axis and wherein the battery transport further comprises a locating carriage carrying and movably supporting the battery carriage for locating the battery carriage along a second transport axis perpendicular to the first transport axis.

15. The battery swap system of claim 14 further comprising:

a second locating carriage for movement along the second transport axis; and a second battery carriage carried by the second locating carriage for movement along a third transport axis perpendicular to the first transport axis.

16. The battery swap system of claim 1 further comprising a battery charging system supported by the support frame, the battery charging system comprising a battery connection interface for releasable connection to the battery while the battery is supported by the battery carriage.

17. The battery swap system of claim 16, wherein the battery connection interface is movable relative to the support frame between a battery connected position and a withdrawn position.

18. The battery swap system of claim 1 further comprising a top deck supported by the support frame above the battery carriage and spaced from the battery carriage by height greater than a height of the battery to be carried by the battery carriage.

19. The battery swap system of claim 1 further comprising an actuatable carriage suspension system supported by the support frame to adjust at least one of roll, pitch, and height of the battery carriage relative to the support frame.

20. The battery swap system of claim 1 further comprising:

a camera supported by the support frame; and a powered actuator operably coupled to the battery carriage; and a controller to output control signals to controllably actuate the powered actuator to move the battery carriage based upon signals from the camera.

21. A battery swap system comprising:

a battery transport comprising:

a support frame;

a connector coupled to the support frame and configured to co2nect to a powered vehicle for moving the battery transport;

a first battery carriage movably coupled to the support frame and configured to horizontally carry a battery from a transport supported position to a tractor received position;

a second battery carriage movably coupled to the support frame and configured to carry a second battery from a transport supported position to a tractor received position.

22. The battery swap system of claim 21, wherein the battery transport comprises wheels or tracks coupled to the support frame for rotation about an axis, wherein the battery carriage is movable to carry the battery along a second axis parallel to the axis and wherein the second battery carriage is movable to carry the second battery along a third axis parallel to the axis.

* * * * *